(12) United States Patent
Gebhardt et al.

(10) Patent No.: US 10,351,344 B2
(45) Date of Patent: Jul. 16, 2019

(54) PALLET TRANSPORT DEVICE

(71) Applicant: Gebhardt Fördertechnik GmbH, Sinsheim (DE)

(72) Inventors: Marco Gebhardt, Sinsheim (DE); Christian Schindler, Mönchengladbach (DE); Michael Weber, Kaiserslautern (DE)

(73) Assignee: GEBHARDT FOERDERTECHNIK GMBH, Sinsheim (DE)

( * ) Notice: Subject to any disclaimer, the term of this patent is extended or adjusted under 35 U.S.C. 154(b) by 0 days.

(21) Appl. No.: 15/016,895

(22) Filed: Feb. 5, 2016

(65) Prior Publication Data
US 2016/0229630 A1 Aug. 11, 2016

(30) Foreign Application Priority Data
Feb. 6, 2015 (DE) .................. 10 2015 001 410

(51) Int. Cl.
*B65G 1/04* (2006.01)

(52) U.S. Cl.
CPC .... *B65G 1/0492* (2013.01); *B65G 2201/0267* (2013.01); *B65G 2203/0283* (2013.01); *B65G 2203/044* (2013.01)

(58) Field of Classification Search
None
See application file for complete search history.

(56) References Cited

U.S. PATENT DOCUMENTS

| 3,978,995 | A | 9/1976 | Zollinger et al. |
| 4,459,078 | A | 7/1984 | Chiantella et al. |
| 9,694,976 | B1* | 7/2017 | Wurman .............. B65G 1/137 |
| 2016/0194151 | A1* | 7/2016 | Lindbo .............. B65G 1/0464 |
| | | | 414/266 |

FOREIGN PATENT DOCUMENTS

| CN | 103612882 A | 3/2014 |
| CN | 103895995 A | 7/2014 |
| CN | 103896000 A | 7/2014 |
| DE | 1556071 A | 9/1969 |
| DE | 3207860 A | 9/1982 |

(Continued)

OTHER PUBLICATIONS

German Search Report dated Dec. 7, 2015 for the corresponding German Application No. 102015001410.2.

*Primary Examiner* — Mark C Hageman
(74) *Attorney, Agent, or Firm* — Leason Ellis LLP

(57) ABSTRACT

A pallet transport apparatus within a rack installation oriented orthogonally with a longitudinal x direction, a transverse z direction and a vertical y direction has a travel route in the x direction and in the z direction. In the apparatus, an x traveling mechanism/x wheel units and a z traveling mechanism/z wheel units are designed so as to be vertically moveable in the y direction mechanically independently of one another. The apparatus has an x lifting device for lifting the x traveling mechanism or of the x wheel units in the y direction, a z lifting device for lifting the z traveling mechanism or of the z wheel units, and a y lifting device for moving the pallet pickup unit. The x/z lifting devices can be activated in the y direction independently of one another and independently of the y lifting device.

8 Claims, 38 Drawing Sheets

(56) References Cited

FOREIGN PATENT DOCUMENTS

| | | | |
|---|---|---|---|
| DE | 102010005591 A | | 7/2011 |
| EP | 2 308 778 A | | 4/2011 |
| EP | 2 308 777 B | | 12/2012 |
| FR | 2685306 A | | 6/1993 |
| FR | 2 730 715 A | | 8/1996 |
| GB | 1 326 304 A | | 8/1973 |
| JP | 08-157016 A | | 6/1996 |
| WO | WO-2005/077789 A | | 8/2005 |
| WO | WO-2014/090684 A | | 6/2014 |
| WO | WO-2014/195867 A | | 12/2014 |

* cited by examiner

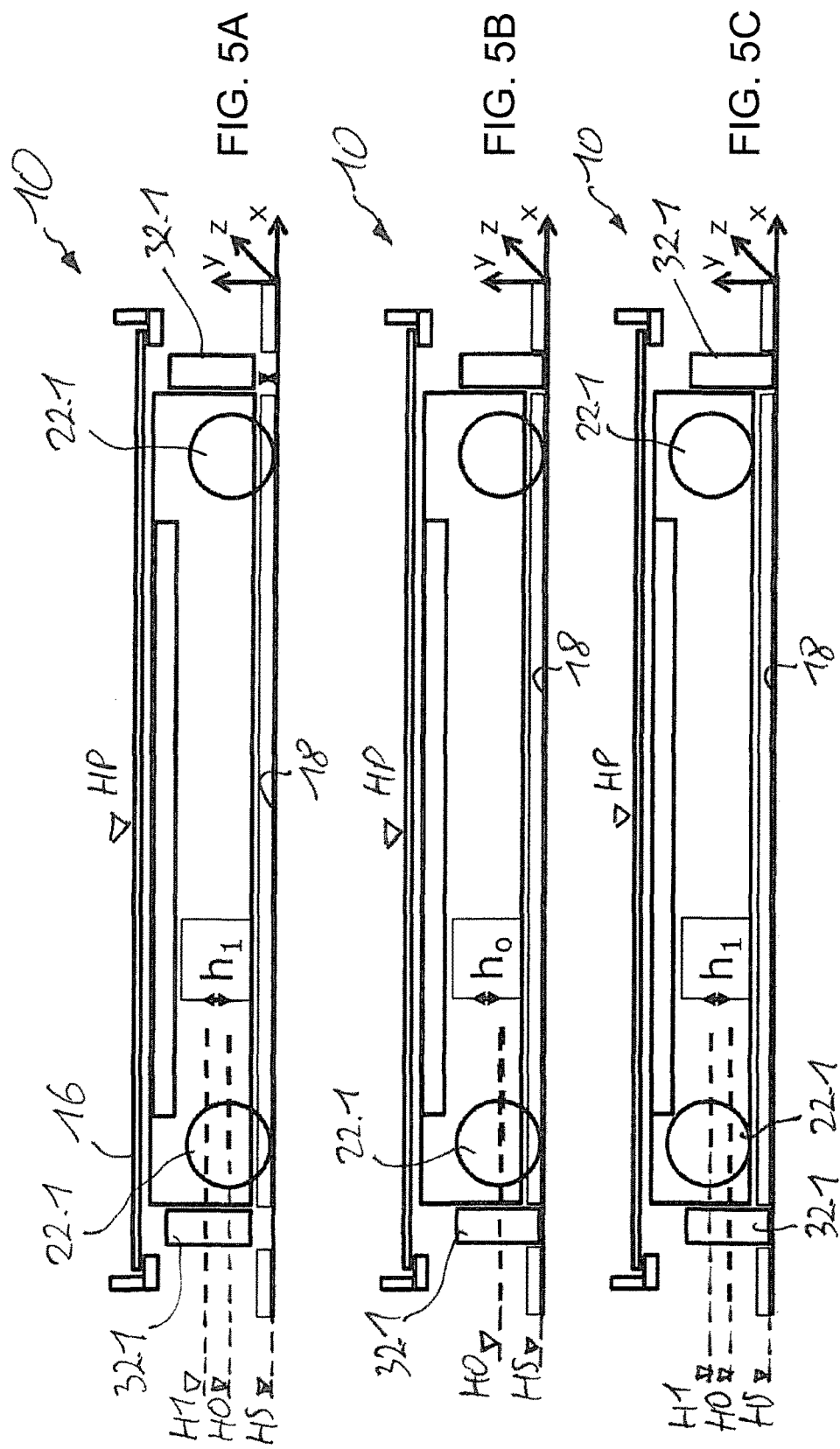

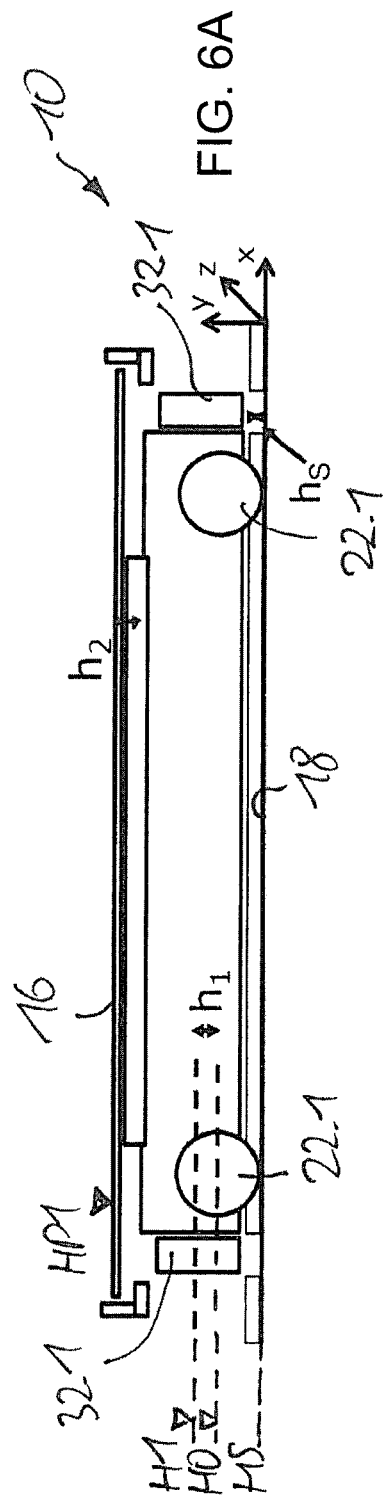
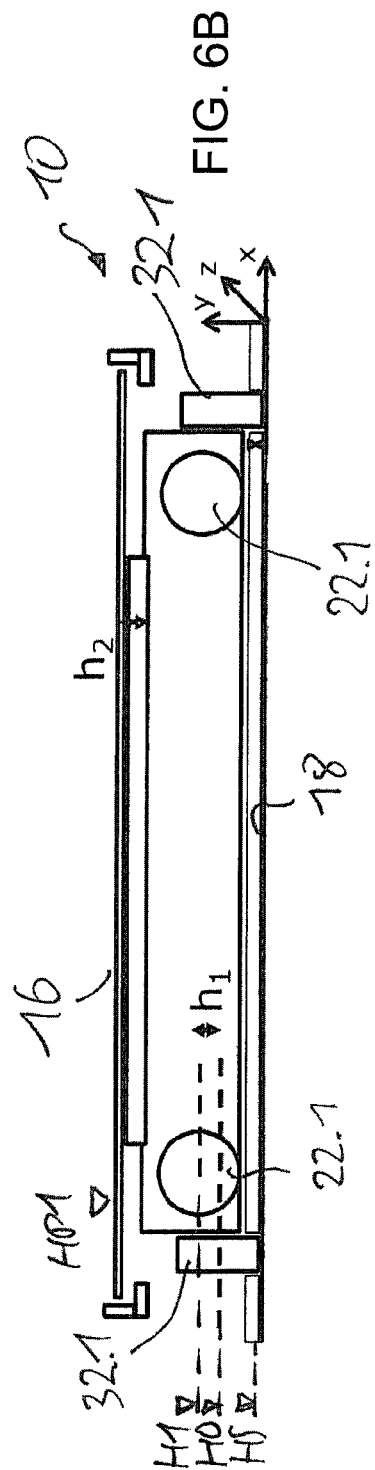

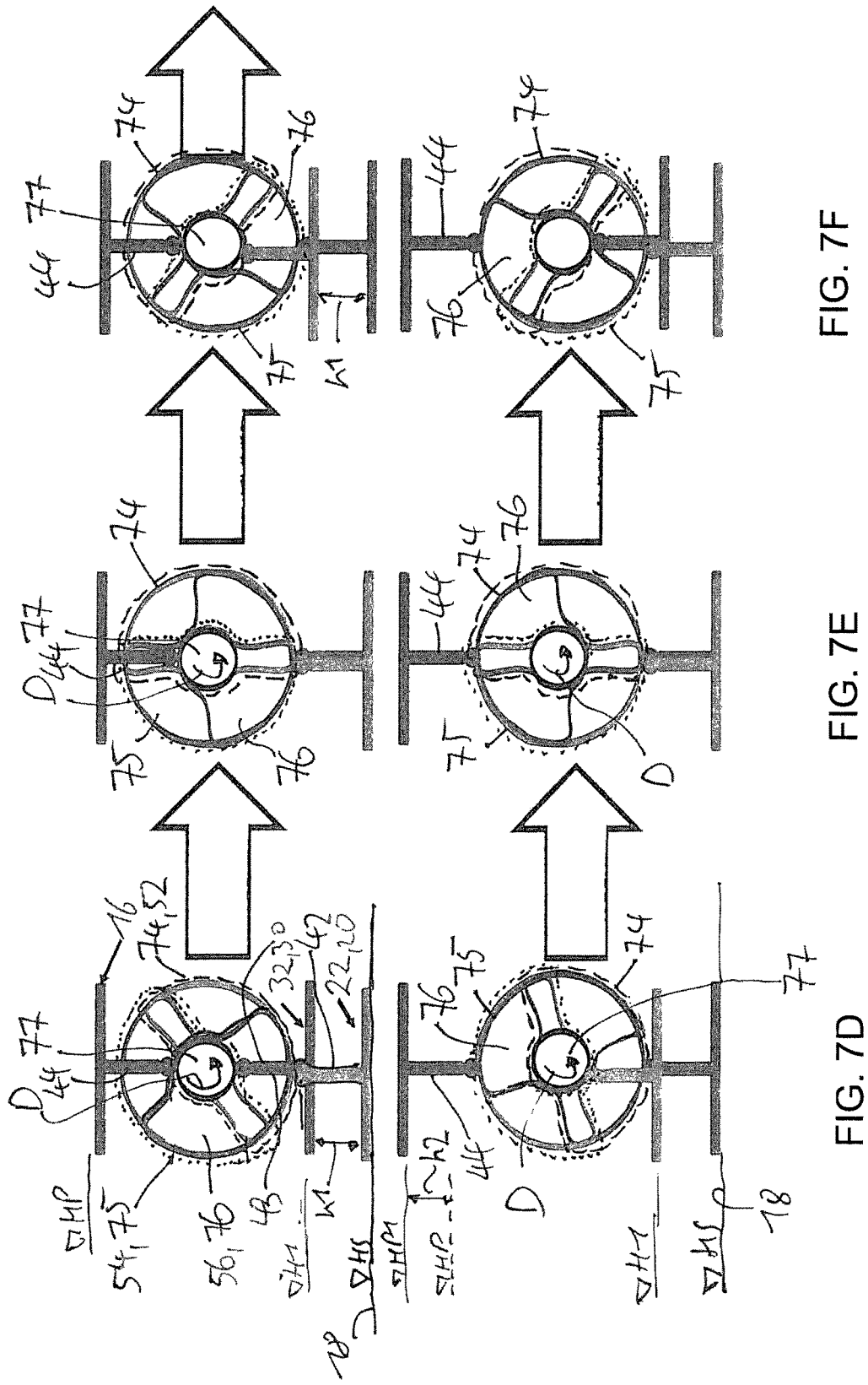

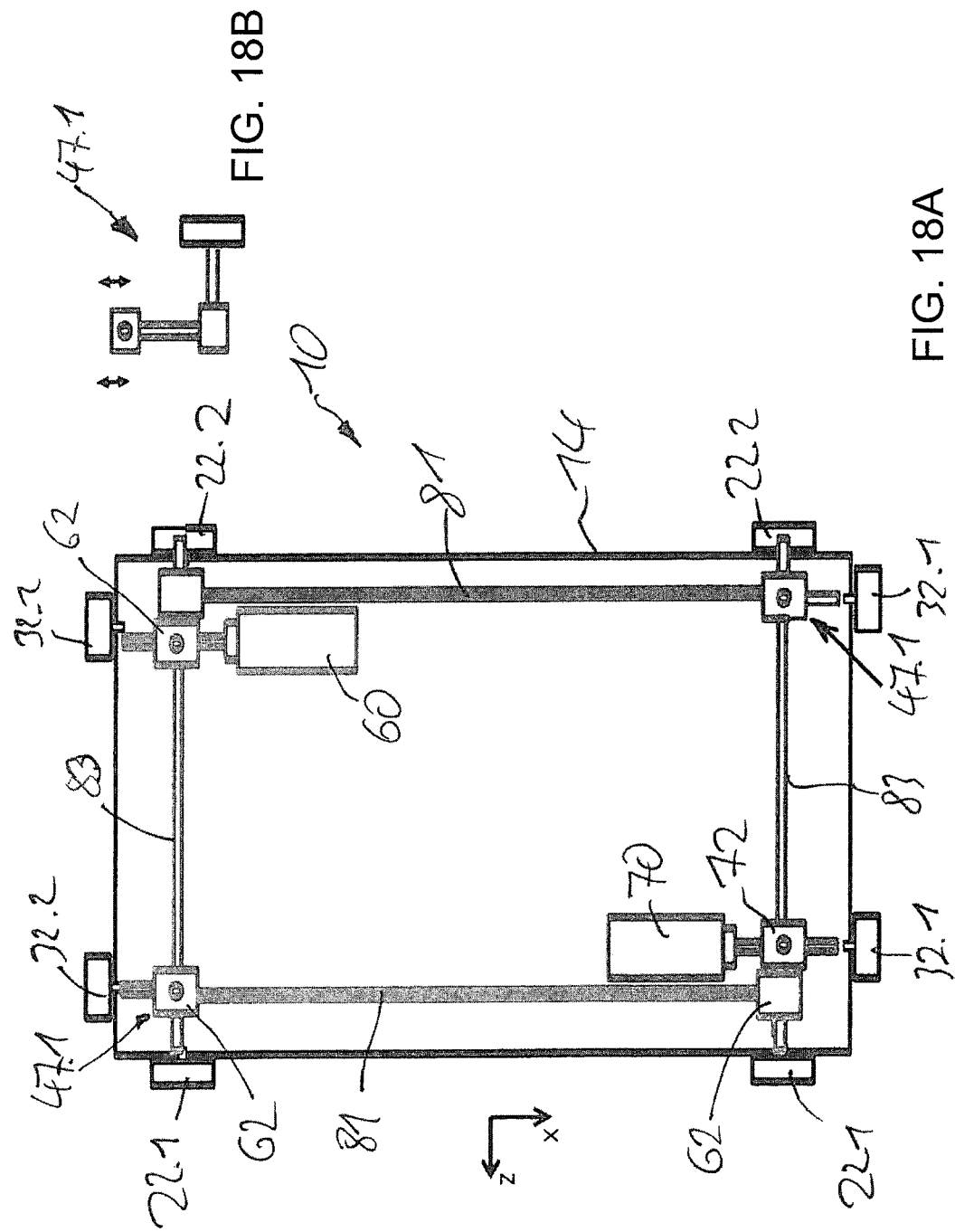

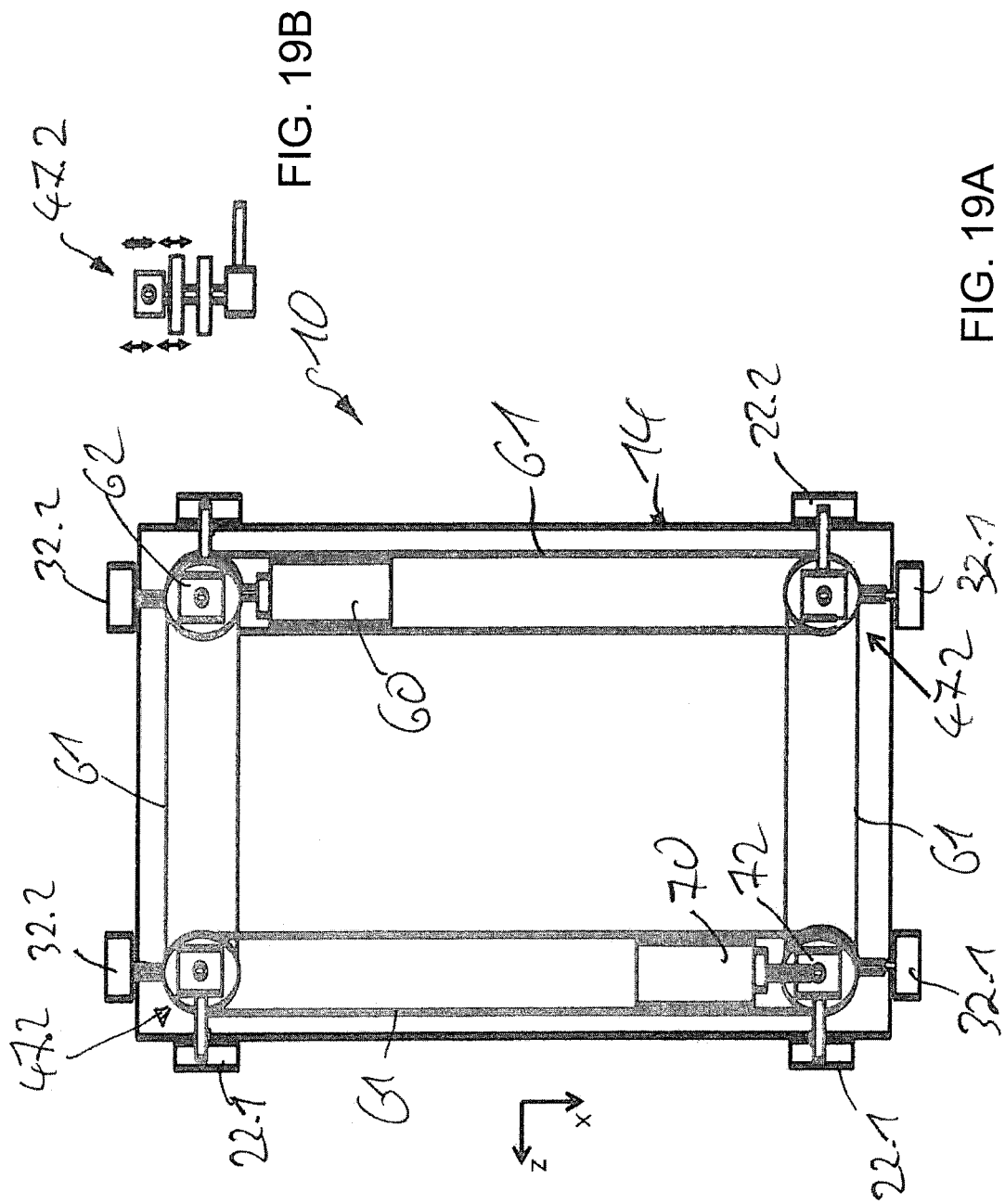

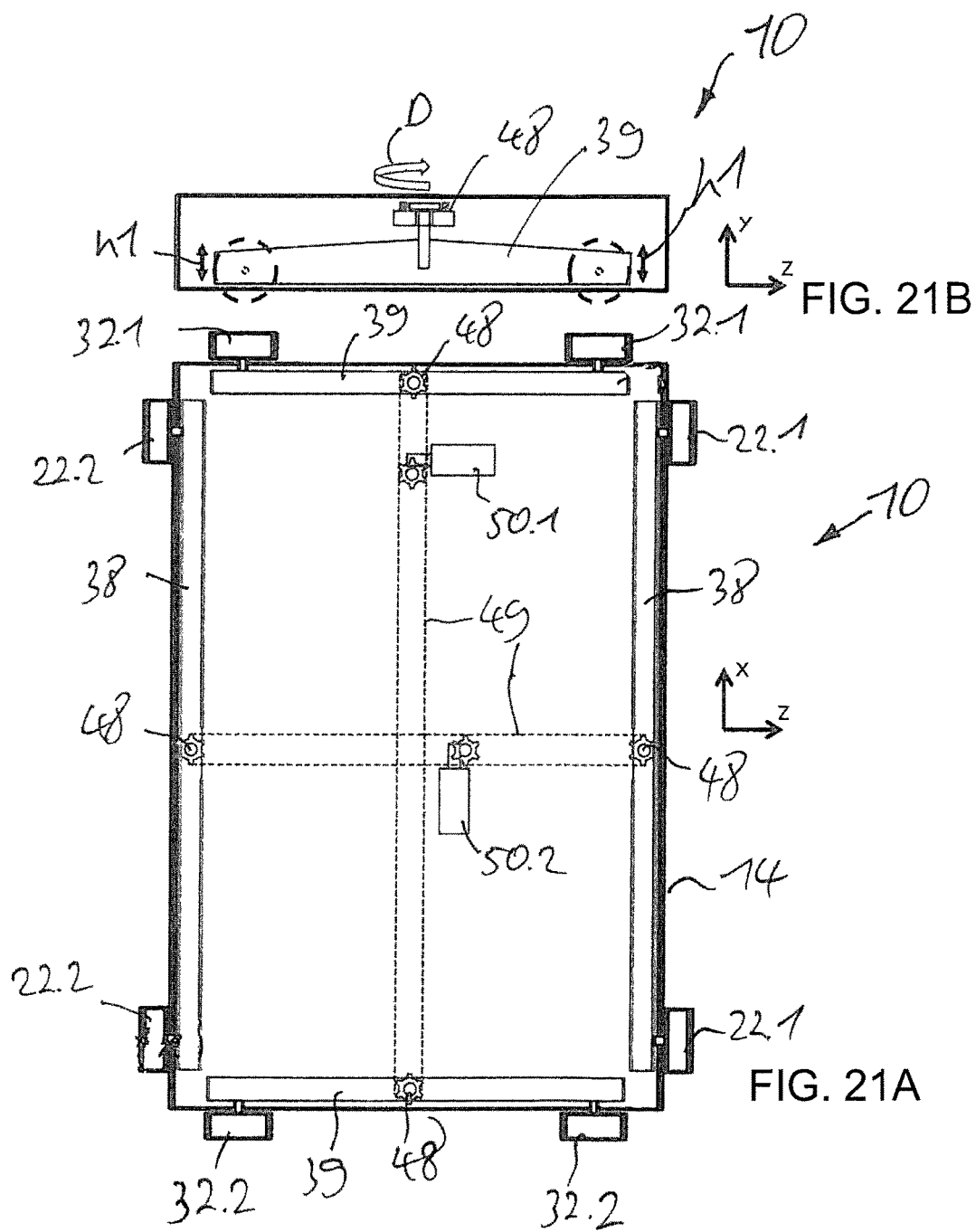

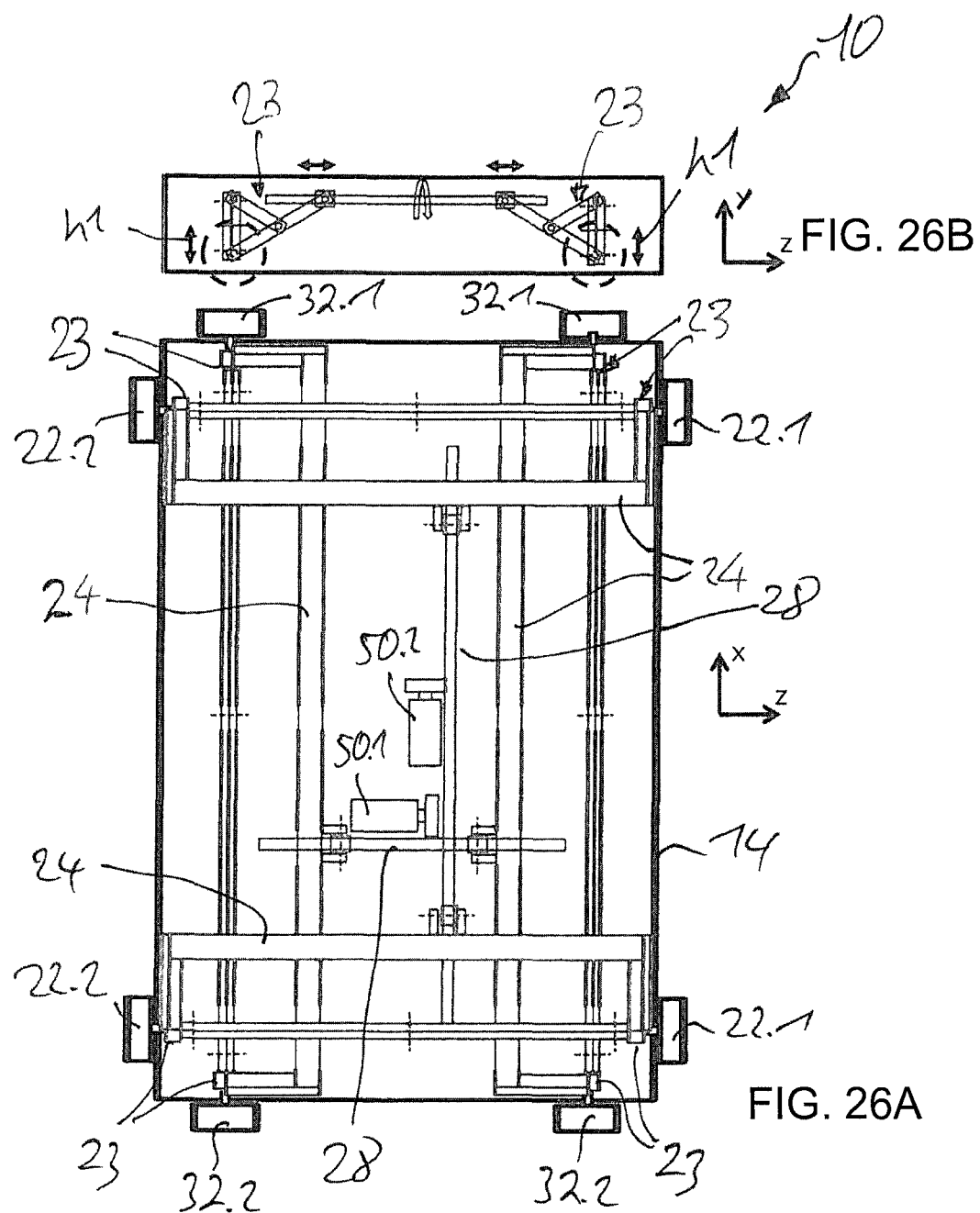

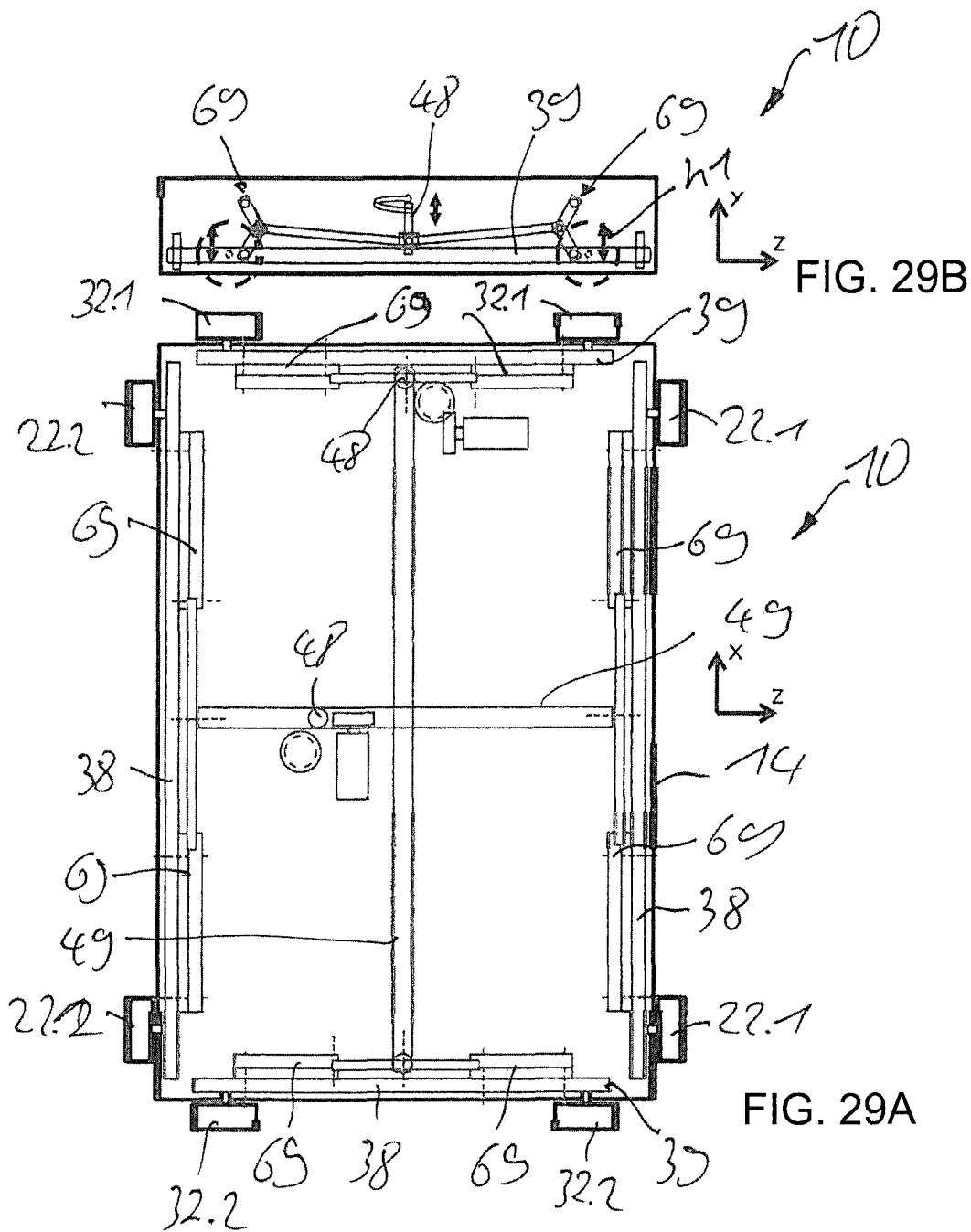

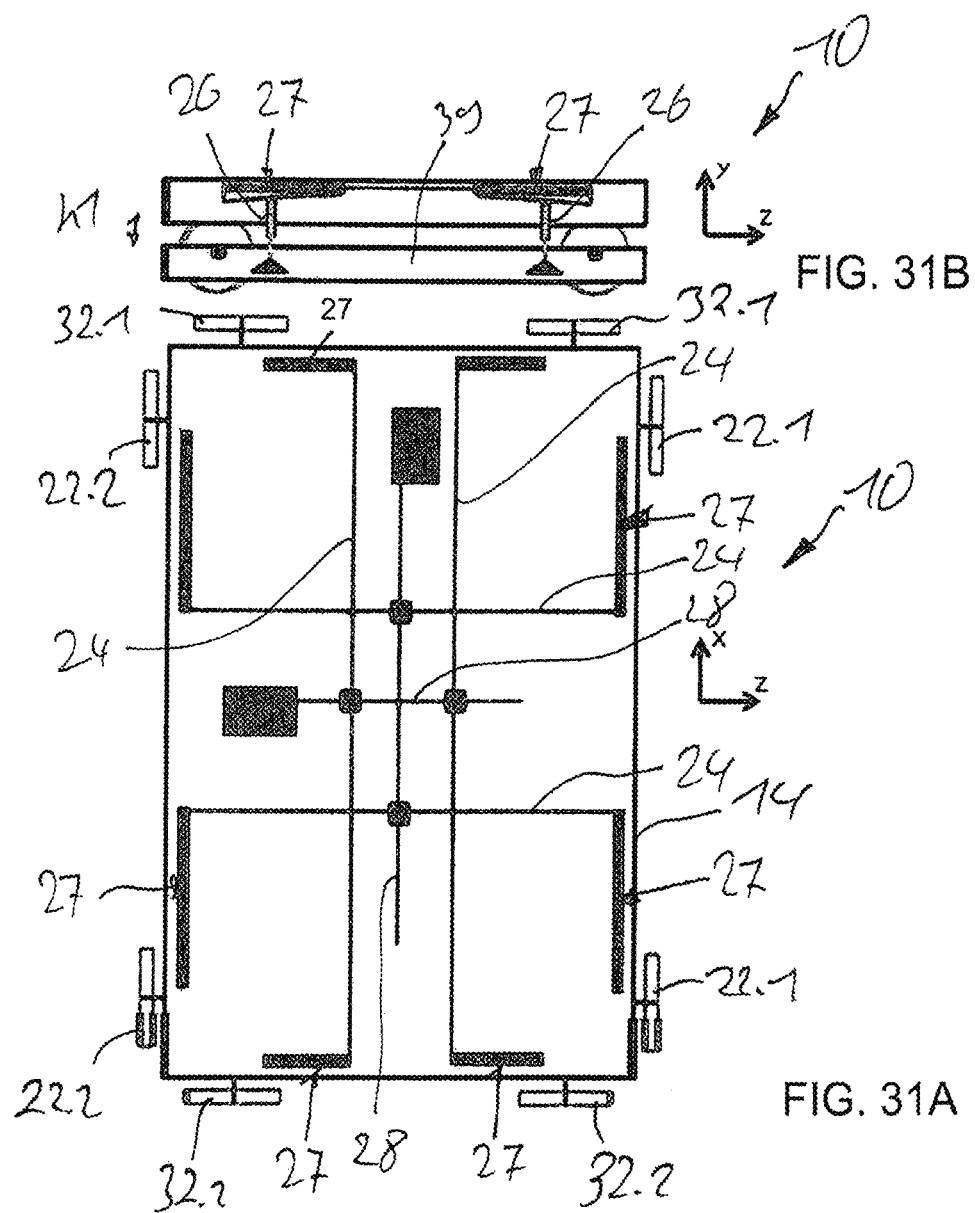

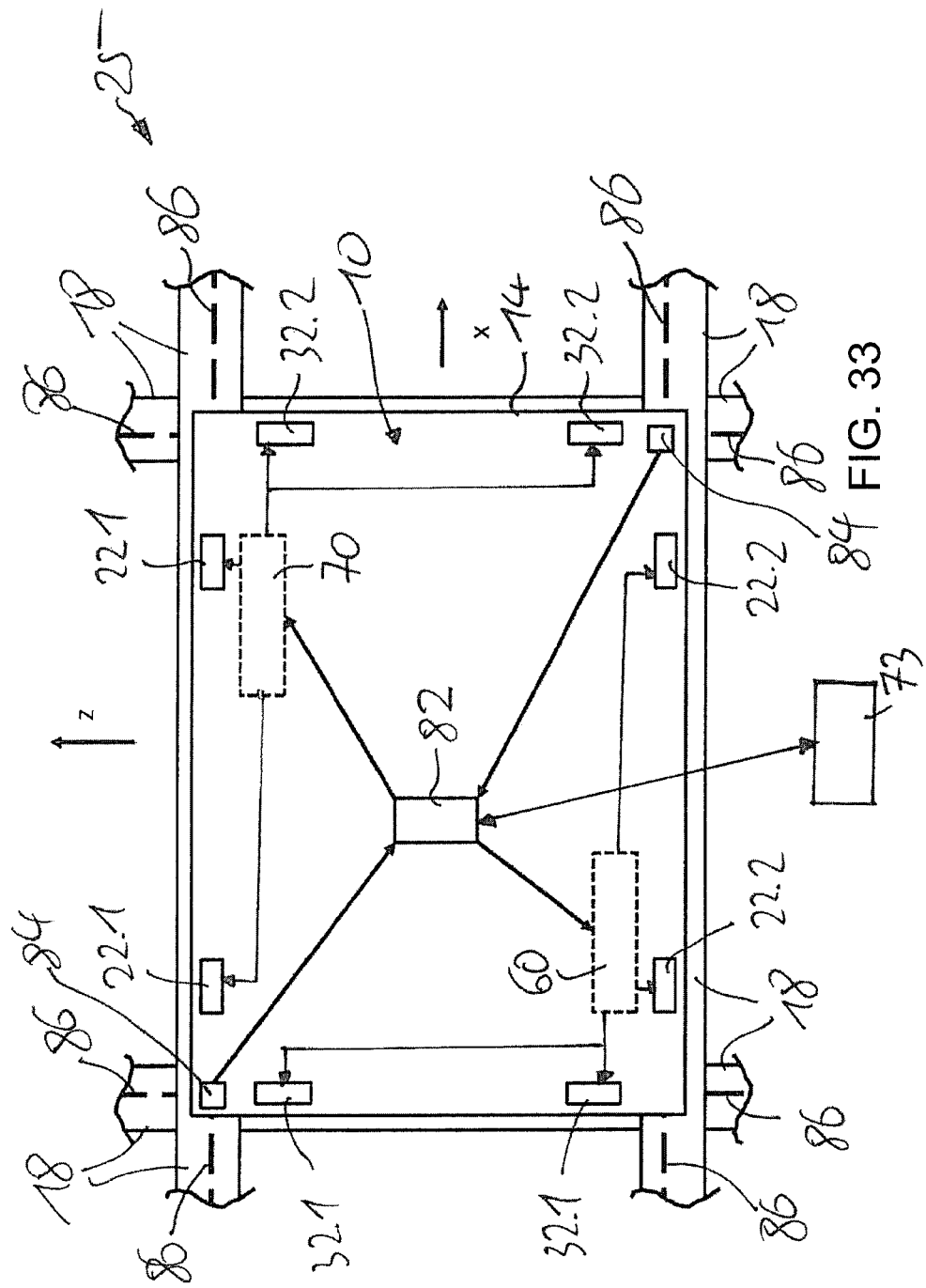

PALLET TRANSPORT DEVICE

This application claims the benefit of German Patent Application No. 10 2015 001 410.2, filed on Feb. 6, 2015, which is incorporated by reference in its entirety herein.

FIELD OF THE INVENTION

The present invention relates to a pallet transport apparatus for transporting pallets within a rack installation, which is oriented orthogonally with a longitudinal direction, a transverse direction and a vertical direction, along a travel route with longitudinal transport routes in the x direction and transverse transport routes in the z direction, comprising a chassis with a pallet pickup unit, an x traveling mechanism for moving in the longitudinal direction with drivable left x wheel units and right x wheel units which are arranged laterally on the left and right spaced apart in the x direction, a z traveling mechanism for moving in the transverse direction with drivable, spaced-apart, left z wheel units and right z wheel units which are arranged laterally on the left and right, travel drive assemblies for the wheel units, with the x or z wheel units being able to be brought into contact with the travel route depending on the x or z travel direction.

Pallet transport apparatuses of this type are also called pallet shuttles.

BACKGROUND OF THE INVENTION

High-bay stores for storing a unit load in a compressed manner, wherein the unit load is mounted on pallets, are used in a multiplicity of widely varying geometries and generally have a plurality of racks which are preferably erected in rows and in which the unit load can be stored or retrieved. High-bay stores of this type are often operated with regard to storage and retrieval by means of forklift trucks, wherein the forklift trucks move in the passages between the rows formed by the racks. Storage systems of this type are not optimal with regard to the economic use thereof. Automation of high-bay stores of this type is therefore sought using loading and unloading systems which reliably permit supply or retrieval of a unit load to or from predefined storage spaces within the rack apparatus.

In DE 10 2010 005 591 A1 is a high-bay store for storing pallets, comprising a plurality of high racks described which are erected in rack aisles, and therefore passages are produced between the rack aisles, wherein storage channels in which at least one pallet can be stored are formed in the high racks, wherein use is made of what is referred to as a tandem shuttle which comprises a passage truck and a channel truck, wherein the passage truck is designed for travel on a passage rail region and the channel truck is designed for travel on a channel rail region. The channel truck is designed for transport of a pallet in a channel rail region, and the passage truck is designed for transport of the channel truck in a passage rail region. In addition, use is made of a vertical transport device which permits transport of the tandem shuttle from a first plane onto a second plane.

A similar solution is in DE 32 07 860 A1 described which relates to a conveyor device for a warehouse system, with high racks erected in rows. A low-height truck which carries a carrier truck in piggyback fashion can be moved between the rows in order to fetch a unit load from the respective racks. The low-height truck can be moved here together with the carrier truck and the unit load in an elevator in order to be transported by the latter between the floors and a transfer station.

As closest prior art, DE 1 556 071 A1 describes a mechanized pallet rack store with a rack structure, into the pallet channels of which, which are provided with pallet support consoles and travel rails, optionally mechanized lift trucks can be moved over the entire length, said pallet rack store having transverse travel tracks floor by floor, at the end of which elevators open, in which the lift trucks can be transported in the vertical direction. The lift truck itself has two traveling mechanisms for the x direction and z direction. There is a travel drive assembly for each direction. Furthermore, there is a lift drive assembly for raising and lowering the traveling mechanisms for a change of direction. The change of direction is undertaken here in such a manner that the lift truck carries out a lifting/lowering movement of the traveling mechanisms, wherein, during this operation, the pallet pickup unit also has to be raised or lowered. This requires a relatively high energy expenditure since, for the change of direction, the weight of the pallet pickup unit, and therefore also the pallet mounted on the pallet pickup unit, has to be raised or lowered. The approach dimension is also changed because of the additional lift.

WO 2005/077789 A1 discloses an automated warehouse rack store comprising pallet transport apparatuses which are arranged so as to be movable in the x and y direction within the warehouse. In this case, there is a set of wheels for each direction (x, z). The drive of the various sets of wheels is controlled here via two couplings. The shuttle has three configurations, namely the travel in the passage direction, the travel in the pallet direction and the lifting in the pallet direction. Transverse movements in the z direction are possible only on special passages. A complete, variable movement on the plane in the x and z direction is not possible. The straight-ahead movement is not controlled; on the contrary, use is made of lateral guide rollers and rails which are intended to keep the shuttle in the track thereof. The drive and movement means for the travel in the longitudinal and transverse direction x, z can be activated separately here.

U.S. Pat. No. 3,978,995 A discloses a storage installation with a pallet shuttle which permits only travel in the x direction, in which a mechanism lifts the pallets from the rack, a change of direction is not possible and only single-depth storage within the rack system is possible.

EP 2 308 778 A2 and EP 2 308 777 B1 disclose an automatic storage shuttle of the type mentioned at the beginning, with an upper carrier surface which can carry a loading unit, a lifting device in order to raise/lower the upper carrier surface, four wheel arrangements which are arranged in each case in the corner region of the shuttle and are drivable individually, in each case via a drive assembly. The wheels are present so as to be rotatable through 90°, and therefore a change of direction is possible. All four wheels are in each case driven individually via a corresponding drive assembly. Sensors present on the drive wheels detect the respective wall distance to the surrounding components. The rotational speed or the torque of the driven wheels is regulated via a control device depending on received signals. The movement of the shuttle is possible in two vertical directions by rotation of the wheel arrangements through 90°.

JP 08157016 A discloses a pallet shuttle in which wheel units are in each case arranged in the corner region, the wheel units having a dedicated drive assembly and being rotatable in the driving direction thereof in the x or z direction as required. The pallet pickup unit can be raised or lowered via a special mechanism.

SUMMARY OF THE INVENTION

The present invention is based on the object or the technical problem of specifying a pallet transport apparatus of the type mentioned at the beginning which can be operated energy-efficiently, can be produced economically, permits a change of direction of the travel direction from the x into the z direction with little structural outlay, ensures permanently reliable operation and ensures a positionally precise movement of the pallet transport apparatus in the x and z direction within a rack system, has a compact structure and, all in all, permits an automatic and efficient storage of a unit load within a rack installation.

The pallet transport apparatus according to the invention according to one embodiment is accordingly distinguished in that the x traveling mechanism/the x wheel units and the z traveling mechanism/the z wheel units are designed so as to be vertically moveable in the y direction mechanically independently of one another, there is an x lifting device for the movement of the x traveling mechanism or of the x wheel units in the y direction, there is a z lifting device for the movement of the z traveling mechanism or of the z wheel units in the y direction, there is optionally a y lifting device for the movement of the pallet pickup unit, the x/z lifting devices are designed so as to be activatable in the y direction independently of one another and independently of the y lifting device of the pallet pickup unit.

A particularly preferred refinement is distinguished in that there is a single lifting drive assembly which activates the lifting movement of the x or z and/or of the y lifting device, or there is an x lifting drive assembly and a z lifting drive assembly for the x/z lifting device.

An advantageous development is distinguished in that the lifting devices are designed in such a manner that a change of direction of the travel direction from the x direction into the z direction and vice versa takes place by corresponding lowering and raising of the respective x/z traveling mechanisms or of the respective x/z wheel units without a simultaneous displacement of the pallet pickup unit taking place in the vertical direction via the y lifting device.

A pallet transport apparatus which can be realized in a structurally particularly and is controllable is distinguished in that the lifting devices, the traveling mechanisms and the wheel units are designed in such a manner that in the case of a change of direction from the x direction into the z direction with the apparatus stationary, the z lifting device lowers the z traveling mechanism or the z wheel units to the level of the x traveling mechanism or of the x wheel units and, subsequently, the x lifting device raises the x traveling mechanism or the x wheel units without, in the process, the height level of the pallet pickup unit changing, and, in the case of a change in direction from the z direction into the x direction, the procedure is correspondingly reversed.

An advantageous refinement which permits a lifting movement of the pallet pickup unit independently of the lifting movements of the traveling mechanisms or wheel units is distinguished in that there is a y lifting device for the movement of the pallet pickup unit in the y direction, the y lifting device being designed to be activatable independently of the x and z lifting device.

A particularly advantageous development which can be realized in a structurally simple manner, ensures permanently reliable operation and permits a compact design is distinguished in that each lifting device has at least one rotatable disk cam or at least one displaceable connecting link disk to which the respective traveling mechanism or the respective wheel units and/or the pallet pickup are coupled, wherein the geometry of the disk cams or connecting link disks determines the size and the temporal profile of the mechanically independent movement of the respective traveling mechanism/of the wheel units or pallet pickup unit in the y direction.

A particularly advantageous refinement within the context of a compact construction is distinguished in that all of the disk cams/connecting link disks for the traveling mechanisms/wheel units or the pallet pickup unit are arranged on a rotatable shaft or on a sliding mechanism, and the movement sequences for the change of direction/lifting of the pallet pickup unit with respect to the lifting routes, which are temporally coordinated with one another, in the y direction are stored in the geometry and the positional arrangement of the disk cams/connecting link disks, wherein the activation of the shaft or of the displacement mechanism takes place via at least one lifting drive assembly.

An advantageous development which, in addition to an embodiment which can be realized in a structurally simple manner, also ensures permanently reliable operation as distinguished in that the x lifting device/z lifting device is movable via a drivable spindle device which is in particular present rotatably on each side and acts directly or indirectly on the x traveling mechanism/z traveling mechanism or the x wheel units/z wheel units, and the spindle device is activatably drivable via a common lifting drive assembly or via an x lifting drive assembly for the x traveling mechanism/the x wheel units and via a z lifting drive assembly for the z traveling mechanism/the z wheel units.

The rotational movement of the drive assembly/the drive assemblies to the spindle device or to individual spindles is preferably structurally realized via coupling devices, wherein the coupling mechanism of the coupling devices can be designed, for example, as a simple lever mechanism, as a double lever mechanism, as a scissors mechanism, as a double scissors mechanism or particularly preferably as a toggle lever mechanism.

A particularly further development according to the invention which can also be used independently of the above-described refinement according to the invention of a pallet transport apparatus or in combination therewith is distinguished in that there is a first travel drive assembly and a second travel drive assembly, each travel drive assembly being coupled in each case in terms of drive directly or indirectly in each case to left x wheel units or left z wheel units and to right x wheel units or right z wheel units of a side.

An advantageous refinement which can be realized in a structurally particularly simple manner and ensures permanently reliable operation with a simultaneously compact construction is distinguished in that the coupling device between first and/or second travel drive assembly to the wheel units has at least one angular gearing, a cardan shaft and/or at least one toothed belt and/or at least one chain and/or at least one shaft unit and/or at least one omega drive and/or at least one sliding joint shaft unit.

In a particularly advantageous manner, the coupling device here is designed in such a manner that it realizes the drive of the x wheel units or z wheel units at a different height level in the y direction.

A particularly advantageous refinement here is distinguished in that the first and second travel drive assembly in each case drives in each case the associated x wheel unit/units or x traveling mechanism directly and the associated z wheel unit/units or z traveling mechanism indirectly via the coupling device, or vice versa.

According to an advantageous alternative refinement, the pallet transport apparatus can also be designed in such a manner that the first and second travel drive assembly is connected in each case to the height-displaceable x or z traveling mechanism, that is to say is coupled in terms of movement in the y direction to the traveling mechanism.

In a further advantageous refinement, a variant design of the pallet transport apparatus according to the invention comprises the first and second travel drive assembly being present in a positionally fixed manner within the apparatus.

A particularly advantageous development which ensures permanently reliable operation with respect to the tracking in the x or z direction is distinguished in that a mechanical guide profile apparatus is arranged on one drive side in the x direction and/or on one drive side in the z direction, and is coupled to the x traveling mechanism and/or to the z traveling mechanism, there is a first guide roller device with at least one first guide roller unit, two second guide roller devices with at least one second guide roller unit are arranged in the x or z direction upstream or downstream of the first guide roller device, wherein the guide roller units are designed so as to be freely rotatable about a y axis of rotation, the first and second guide roller device being designed in such a manner that they can be arranged between opposite flanges, which project in the y direction, of an x/z travel route profile of a travel route, and the first guide roller units can be brought into bearing contact with the inner side of the first flange, and the second guide roller units can be brought into bearing contact with the inner side of the second flange, supplemented in that the first and the second guide roller units are designed as pairs of guide rollers.

In order to ensure optimum tracking control and/or position control, a particularly advantageous refinement of the pallet transport apparatus according to the invention is distinguished in that there is a control device for controlling the drive of the first and second travel drive assembly and/or the lifting drive assemblies, and there are sensor units which detect the respective position of the pallet transport apparatus within the rack system and communicate correspondingly with the control device.

An advantageous development is distinguished in that there is at least one first sensor unit which detects travel route markings/position markings present on the travel route and outputs corresponding signals to the control device for the tracking control and/or for the change of direction and/or for the lifting of the pallet pickup unit.

Owing to the fact that the left and right wheel units are in each case driven via two independent travel drive assemblies in each travel direction (x and z), the pallet transport apparatus can be steered "like a tank" and, as a result, a deviation in the travel direction can be corrected at any time.

In this connection, it is particularly advantageous to design the pallet transport apparatus in such a manner that there are two first sensor units which are arranged lying diagonally opposite in the corner region or side of the apparatus.

A particularly advantageous refinement which realizes an optimum sensor control for the straight-ahead movement and the change of travel direction is distinguished in that there are two z sensor units, which are spaced apart in the z direction, on the lower side of the pallet transport apparatus, there are two x sensor units, which are spaced apart in the x direction, on the lower side of the pallet transport apparatus, there is a control device for the lifting assembly and for the first and second travel drive assembly, the z and x sensor units measuring the distance to the inner side of lower-side z or x vehicle profiles forming the travel route and outputting corresponding signals to the control device, during travel in the x or z direction, the control device calculating a possible angular deviation from the straight-ahead movement on the basis of the signals of the x sensor units or of the z sensor units and activating the first/second travel drive assembly correspondingly in order to correct the angular deviation, during a change of travel direction from the x into the z direction or from the z into the x direction, the control device activating the lifting drive assembly or the lifting drive assemblies correspondingly on the basis of the signals of the x or z sensor units on reaching a predetermined distance to the x or y travel profile, that is to say on reaching the changing position, in order to carry out the change of travel direction.

In order to ensure optimum, permanently reliable operation within the storage and retrieval mode in a rack apparatus and in order to reduce the susceptibility to faults, a particularly advantageous development of the pallet transport apparatus according to the invention is distinguished in that there are further sensor units which communicate with the control device and which serve for collision identification in the x and z direction and/or for identifying the occupancy of the storage space and/or for identifying the height level of the pallet pickup unit and/or for detecting the occupancy state of the pallet pickup unit.

Use can be made of sensor units which are based on an optical, inductive, magnetic or mechanical working principle.

The substantial advantages and features essential for the invention can be presented by way of example as specified below:

With the pallet transport apparatus according to the invention, a change of direction x to z direction and vice versa is provided without lifting and lowering the load (pallet pickup unit), which has a favorable effect on the energy consumption since the lifting drive assemblies do not consume any energy for lifting and lowering the pallet load during the change of direction. Furthermore, all of the wheel units of the pallet transport apparatus are driven, which has a positive effect on a reliable movement and positioning of the pallet transport apparatus. Advantageous guiding properties of the pallet transport apparatus according to the invention along the predetermined travel route arise by means of the separately activatable drive for the left and right wheel side (traveling mechanism, wheel unit).

The three independent lifting devices for the x, z and y direction for the x and z traveling mechanisms or x and z wheel units and the pallet pickup unit are given clearly defined structural elements for the change of travel direction and the lifting of the pallet pickup unit. Said independent lifting devices can be activated in a particular manner with respect to the respective displacement distance thereof via disk cams or connecting links, wherein the elements mentioned the sequence program for the change of travel direction or the movement of the pallet pickup unit in the disk cam/connecting link geometry and the arrangement of the disk cams/connecting links with respect to one another is stored and can be mechanically retrieved in a permanently reliable manner. The sequence program is preferably controlled here via one or optionally two driving motors.

At the same time, a lifting movement of the pallet pickup unit during travel in the z direction is also possible, this being possible, for example, within the context of use within the pre-zone of the rack installation, that is to say in the region in which no travel routes are predetermined in the x and z direction.

In principle, the pallet transport apparatuses can also be used for traveling in the pre-zone of the rack installation, wherein active changes of direction can easily be realized in the pre-zone by changing the traveling mechanisms or sets of wheels or by different speeds of the wheel unit (crawler vehicle principle). In this way, the use possibilities of the pallet transport apparatus also extend outside the actual rack apparatus, namely in the pre-zone, in which the most varied travel routes can easily be realized in this region.

With the pallet transport apparatus according to the invention, a change of direction without lifting the pallet pickup unit, travel in two directions (x and z direction) and also control of the straight-ahead movement can easily be realized in a particularly advantageous manner on the basis of a compact overall construction with permanently reliable operation being ensured. Simply and permanently reliably operating mechanical constructions can easily be realized for the coupling in the case of the lifting drive assemblies to the lifting devices and in the case of the travel drive assemblies to the traveling mechanisms or the wheel units.

In a preferred embodiment, two travel drive assemblies and one lifting drive assembly are required for the pallet transport apparatus according to the invention, that is to say a total of only three drive assemblies. All in all, the pallet transport apparatus according to the invention is distinguished in that it uses less energy than the known apparatuses and the components are subject to little wear. Furthermore, the pallet transport apparatus according to the invention has a substantially lower construction than comparable known solutions with travel in the x and z direction.

Furthermore, in addition to moving in an orthogonal x or z direction, the pallet transport apparatus according to the invention also permits curved travel which can advantageously be used, for example, in the pre-zone of the rack installation—without the specification of orthogonal travel routes. In curved travel, what is referred to as a tank drive is realized here since respectively opposite wheel sides can be activated differently by the two independent travel drive assemblies.

Further embodiments and advantages of the invention emerge from the features furthermore specified in the claims and from the exemplary embodiments indicated below. The features of the claims may be combined with one another in any manner unless they are clearly mutually exclusive.

BRIEF DESCRIPTION OF THE DRAWINGS

The invention and advantageous embodiments and developments of same are described and explained in more detail below with reference to the examples illustrated in the drawing. The features which can be gathered from the description and the drawing can be used according to the invention individually by themselves or in a plurality thereof in any combination. In the drawing:

FIGS. 5A, 5B and 5C show a schematic side view of the pallet transport apparatus according to FIGS. 1 and 2 in the event of a different height positioning (y direction) of the x or z wheel units with the pallet pickup unit lowered, FIGS. 6A and 6B show an illustration of the pallet transport apparatus according to FIGS. 5A-C with the pallet unit raised, FIGS. 7A-F show a highly schematized illustration of a detail of the respective lifting position of an x wheel unit, a z wheel unit and the pallet pickup unit, controlled via the rotation of three disk cams arranged on a common shaft, FIGS. 14 to 19B show further structural refinements of the pallet transport apparatus according to FIG. 13 in each case with two travel drive assemblies, with a different structural design of the coupling devices, FIGS. 20A to 32 show a highly schematized (transparent) illustration of a top view of the pallet transport apparatus according to FIG. 3 with in each case a different structural refinement of the coupling devices of the two lifting drive assemblies with the x/z lifting device for the x/z traveling mechanism or the x/z wheel units, FIG. 33 shows a highly schematized illustration a top view of a pallet transport apparatus according to the illustration in the previous Figures with an additional illustration of sensor units for controlling the movement of the pallet transport apparatus in the x or z direction with the aid of travel route markings.

DETAILED DESCRIPTION OF THE INVENTION

Figure 1:
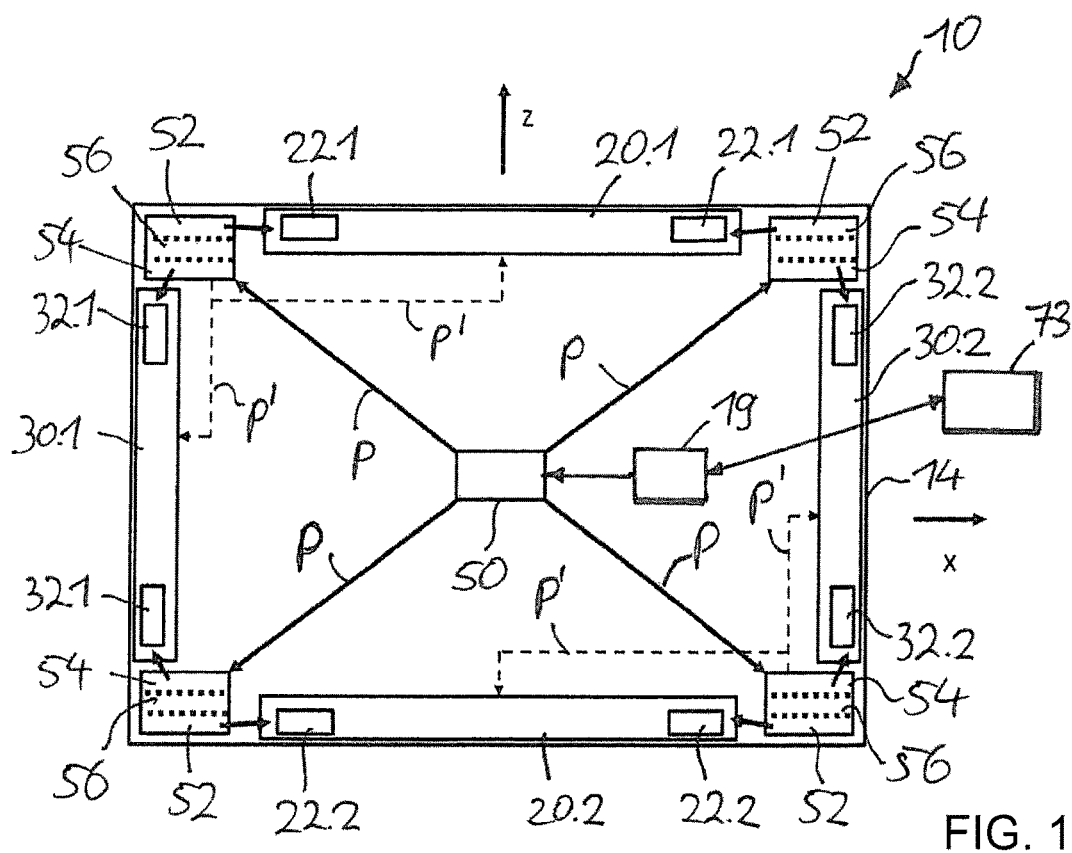
FIG. 1 shows a highly schematized (transparent) illustration of the top view of a first exemplary embodiment of a pallet transport apparatus for moving pallets in the x or z direction with a left and right x traveling mechanism, a left and right z traveling mechanism and in each case two associated left and right wheel units, wherein the traveling mechanisms or wheel units can optionally be raised and lowered in the vertical direction (z) via lifting devices, and the lifting devices are drivable via a lifting drive assembly.
Figure 2:
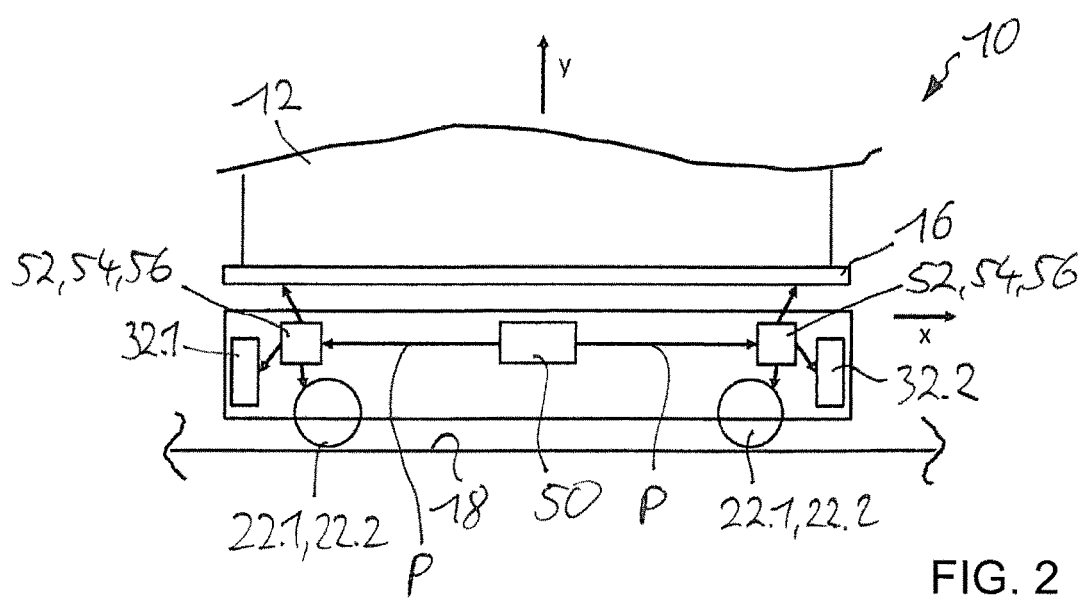
FIG. 2 shows a highly schematized (transparent) side view of the pallet transport apparatus according to FIG. 1 with a pallet unit which is displaceable in the vertical direction (z) and is coupled to a lifting device which is drivable by the lifting drive assembly.

FIGS. 1 and 2 illustrate, in highly schematized form, a first exemplary embodiment of a pallet transport apparatus 10 which is used for transporting pallets 12 with storage articles located thereon, specifically within an orthogonal rack system (x-y-z system of coordinates), not illustrated specifically in FIGS. 1 and 2, along travel routes in the x direction (longitudinal direction) and z direction (transverse direction). The longitudinal direction x and the transverse direction z here are components of an orthogonal directional control system within the rack system, wherein transport means (not illustrated specifically), for example elevators, can be used for transporting the pallet articles in the vertical direction y into the respective floors of the rack system.

The pallet transport apparatus 10 has a chassis 14 on which there is a left and right x traveling mechanism 20.1, 20.2 and a left and right z traveling mechanism 30.1, 30.2, wherein the two left and right traveling mechanisms 20.1, 20.2, 30.1, 30.2 in each case have two left x wheel units 22.1 and right x wheel units 22.2 and two left z wheel units 32.1 and two right z wheel units 32.2, respectively. The traveling mechanisms 20, 30 and the wheel units 22, 32 are vertically displaceable, that is to say are present on the chassis 14 in the y direction.

The vertical displaceability is ensured by the fact that there is a respective x lifting device 52 for the x traveling mechanisms 20 and x wheel units 22, and there is a respective z lifting device 54 for the z traveling mechanism 30 and the z wheel units 32, by means of which lifting devices the respective lifting position can be set for determining the travel route in the x or z direction.

In the exemplary embodiment illustrated, there is a lifting drive assembly 50 which is connected in terms of drive to the lifting devices 52, 54 via coupling means, not illustrated specifically (illustrated symbolically by arrows P). Said coupling means, not illustrated specifically in FIGS. 1 and 2, can have, for example, gearings, cardan shafts, toothed belts, chains, spindles or similar torque-transmitting means.

In FIGS. 1 and 2, each wheel unit 22, 32 is assigned an x/z lifting device 52 and 54, respectively.

The lifting drive assembly is in communicating connection in terms of control to a lifting control device 19, wherein the lifting control device 19 communicates with a master rack system control device 73.

As soon as the pallet transport apparatus 10 is intended to be moved in the x direction, the left and right x wheel units 22 are each brought into contact with the travel route 18 via the x lifting device 52, wherein at the same time the z wheel units 32 are not in contact with the travel route 18. If the pallet transport apparatus 10 is intended to be moved in the z direction, the z wheel units 32 are in contact with the travel route 18 and the x wheel units 22 are present spaced apart therefrom.

All of the wheel units are driven via travel drive assemblies which are not illustrated specifically in FIGS. 1 and 2 and are described further below.

The lifting drive assembly 50 is acted upon with corresponding signals via a lifting control device 19 so that the corresponding wheel units 22, 32 can be brought into contact with the travel route 18 or not brought into contact therewith, depending on the travel direction x or z, via the lifting drive assembly 50, the coupling means and the x/z lifting devices 52, 54.

FIG. 2 illustrates a situation in which the left and right x wheel units 22 are in contact with the travel route 18, and the left and right z wheel units 32.1, 32.2 are present raised in the y direction with respect to the travel route 18, that is to say the pallet transport apparatus 10 is in a state for moving in the x direction. In addition, FIG. 2 also illustrates, on the upper side of the chassis 14, a pallet pickup unit 16 which is designed it for picking up a pallet with a corresponding storage article. The pallet pickup unit 16 is likewise present displaceably in the vertical direction y via a further lifting device 56 since it is required, for example at transfer stations, for the pallet pickup unit 16 to be raised to a certain extent. In this respect, there is additionally a y lifting device 56 which is likewise activated via the lifting drive assembly 50.

In addition, FIG. 1 illustrates, by means of dashed arrows P', the action of the lifting devices 52, 54 alternatively on the x/z traveling mechanisms 20, 30 which contain the two x or z wheel units 22, 32 in each case.

In the case of the pallet transport apparatus 10 according to FIGS. 1 and 2, there are therefore three independent lifting devices 52, 54 and 56 which serve, in principle independently of one another by a lifting drive assembly 50, for the height positioning (y direction) of the respective position of the traveling mechanisms 20, 30 and the wheel units 22, 32 or the pallet pickup unit 16.

Figure 3:
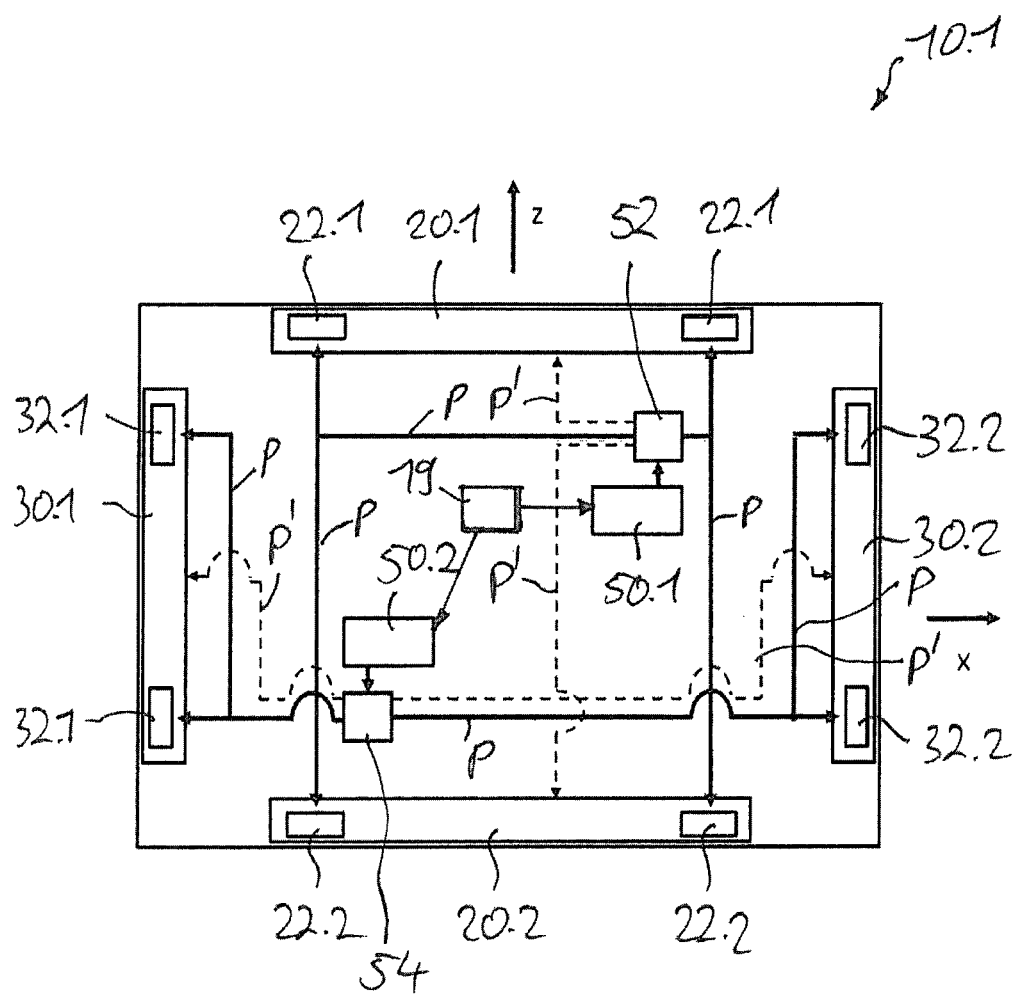
FIG. 3 shows a highly schematized (transparent) illustration of a top view of a second exemplary embodiment of a pallet transport apparatus, wherein the x lifting device and the z lifting device are in each case activatable via a lifting drive assembly.

An alternative refinement of the pallet transport apparatus 10.1 in comparison to the pallet transport apparatus 10 according to FIGS. 1 and 2 is illustrated in FIG. 3. The same components bear the same reference signs and are not explained once again.

In contrast to the pallet transport apparatus 10 according to FIGS. 1 and 2, the pallet transport apparatus 10.1 according to FIG. 3 has an x lifting drive assembly 50.1 and z lifting drive assembly 50.2, which are coupled in terms of drive by the x lifting device 52 and z lifting device 54, respectively, via coupling means to the traveling mechanisms 20, 30 and wheel units 22, 32.

The x lifting drive assembly 50.1 here brings about the lifting or lowering of the left and right x traveling mechanism 20.1, 20.2 or of the left and right wheel units 22.1, 22.2 via the x lifting device 52. Similarly, the z lifting drive assembly 52 brings about the z lifting device 54 the lifting or the lowering of the left and right z traveling mechanisms 30 or of the left and right z wheel units 32.

Both in the case of the exemplary embodiment according to FIGS. 1 and 2 and the exemplary embodiment according to FIG. 3, there are three independent lifting devices 52, 54, 56 in the pallet transport apparatus 10 or 10.1, by means of which lifting devices the lifting movement of the x traveling mechanism 20 or of the z traveling mechanism 30 and/or the lifting movement of the pallet pickup unit 16 can be brought about independently of one another.

Figure 4:
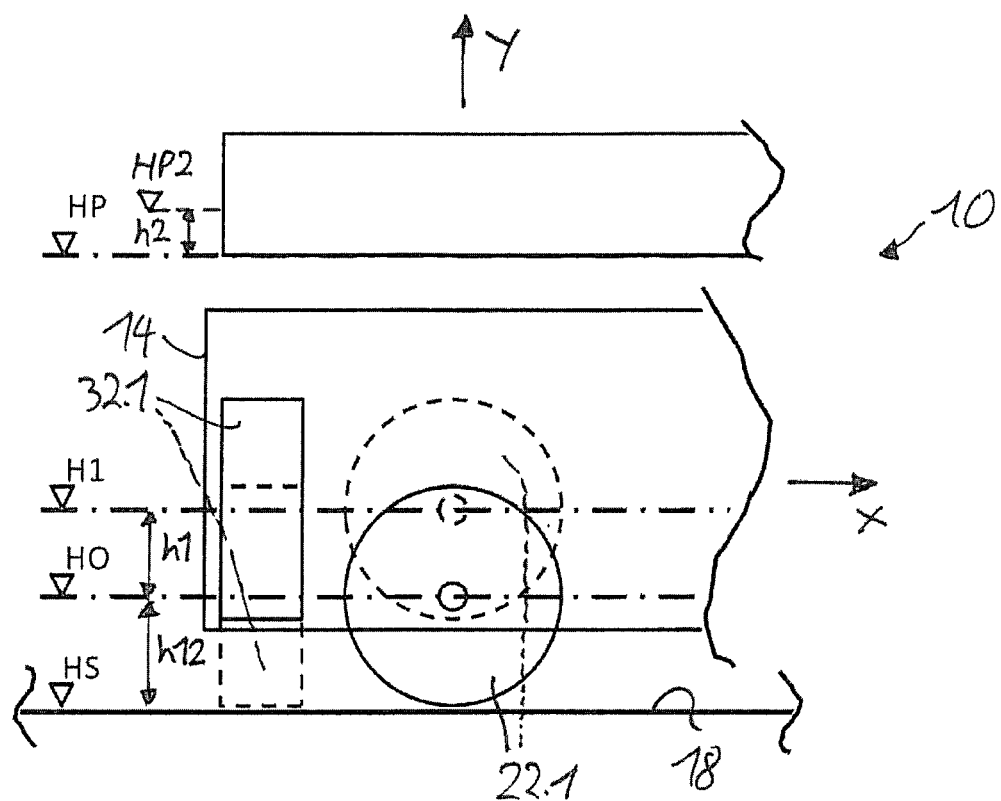
FIG. 4 shows a highly schematized side view of the pallet transport apparatus according to FIG. 2 in the region of an x and z wheel unit, with illustrations of the height level which the wheel units take up depending on the travel direction.

FIG. 4 schematically illustrates the height position of an x wheel unit 22.1 and of a z wheel unit 32.1 in the corner region of the pallet transport apparatus 10. The axis of rotation of the x wheel units 22.1 is located relative to the height level HS of the travel route 18 at the height level H0, and therefore the x wheel unit 32.1 is in contact with the travel route 18 and, upon action by a travel drive assembly, permits the pallet transport apparatus 10 to move in the x direction. In this state, the z wheel unit 32 is located at the height level H1 and is arranged spaced apart from the travel route 18.

The height level of the pallet pickup unit 16 is denoted by HP in FIG. 4. The difference (lifting distance) between the height level H1 and H0 is denoted by h1 in FIG. 4. The difference between the height level H0 and HS is denoted by h12 and depends on the respective diameter of the wheel units 22, 32.

If a change from the x travel direction into the z travel direction is now required, which is determined via a master control apparatus (not illustrated specifically) of the rack system, to which control apparatus the pallet transport apparatus 10 is connected for communication, when stationary the z wheel unit 32.1 or 32.2 is initially lowered from the height level H1 by the amount h1 to the height level H0 via the z lifting device 54 by activation of the lifting drive assembly 50, and therefore the x wheel units 22 and the z wheel units 32 are in contact with the travel route 18. Subsequently, the lifting drive assembly 50 brings about the raising of the x wheel units 22.1 to the height level H1 via the x lifting device 52, and therefore the x wheel units 22 come out of contact with the travel route 18. This temporal sequence is illustrated additionally in FIGS. 5A-C in a side view. The lifting movements of the x wheel units 22 or z wheel units 32 takes place here independently of the height level of the pallet pickup unit 16. FIGS. 5A-C illustrate the situation in which the pallet pickup unit 16 is in the lowered position.

According to the invention, it is also possible to carry out the illustrated lifting movements of the x wheel units 22 or z wheel units 32 even if the pallet pickup unit 16 is in the raised position, which is illustrated schematically in FIGS. 6A and 6B.

The raising of the pallet pickup unit 16 is illustrated by h2 in FIG. 6B.

Owing to the fact that, according to the invention, there are three independent lifting devices 52, 54, 56, it is no longer required—as in the prior art—that, in the event of a change of the travel direction from the x into the z direction and vice versa, the pallet pickup unit 16 with the loaded article located thereon has to be raised, which signifies a considerable energy saving, particularly since the loaded article may have a not inconsiderable weight. These measures have a particularly advantageous effect on the overall energy efficiency of the rack system since the energy saving can be achieved during every change of direction of the pallet transport apparatus 10.

FIG. 7 illustrates, in highly schematized form, a structural refinement of the x lifting device 52, z lifting device 54 and y lifting device 56, which is respectively designed in the exemplary embodiment as disk cam 74, 75, 76, wherein the disk cams 74, 75, 76 are arranged offset in the longitudinal direction thereof on a common rotational shaft 77 and are respectively connected for communication via an x/z/y coupling element 42, 43, 44 to the corresponding traveling mechanisms 20, 30 and wheel units 22, 32 and pallet pickup unit 16. The common axis of rotation 77 is driven here, for example, by the common lifting drive assembly 50, as a result of which the lifting movement of the traveling mechanisms 20, 30 or of the wheel units 22, 32 or of the pallet pickup unit 16 is respectively controlled in a temporal sequence. FIGS. 7A-C show the states with the pallet pickup unit 16 lowered. FIGS. 7D-F show the states with the pallet pickup unit 16 raised.

Figure 34A:
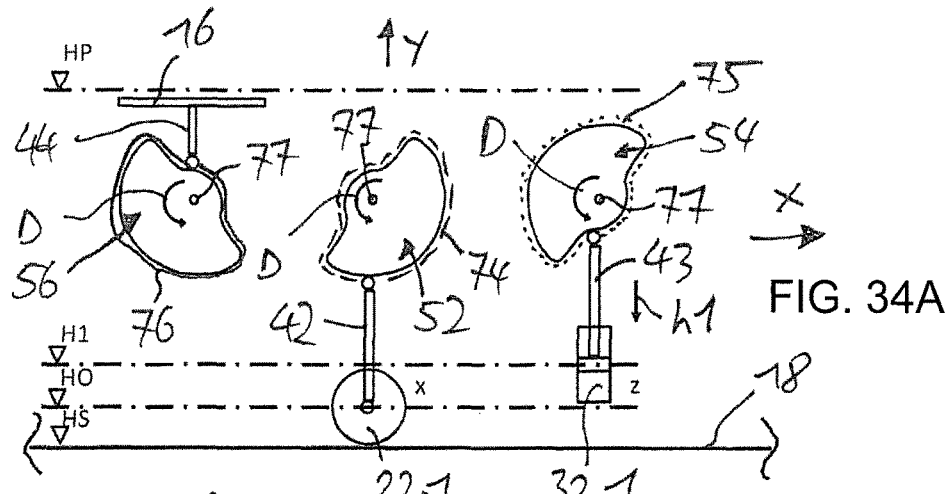
FIGS. 34A-C show a highly schematized illustration of a view of the lifting devices, which are designed as disk cams, according to FIGS. 7A-C in an illustration pulled apart laterally.
Figure 34B:
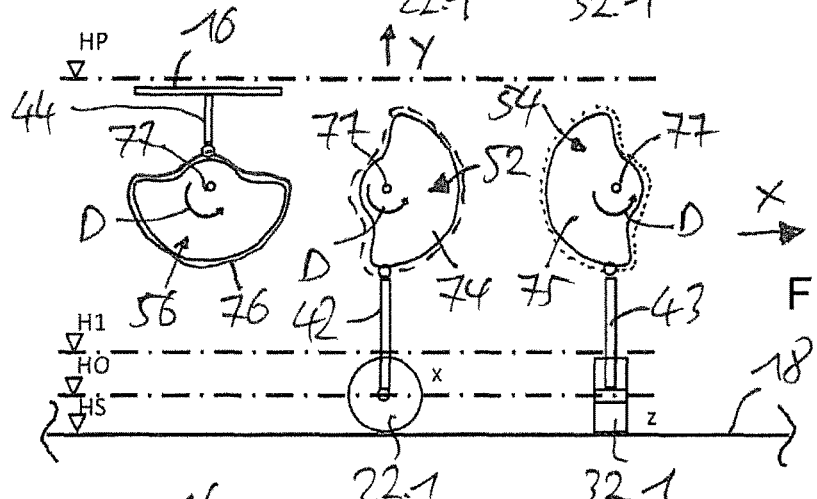
Figure 34C:
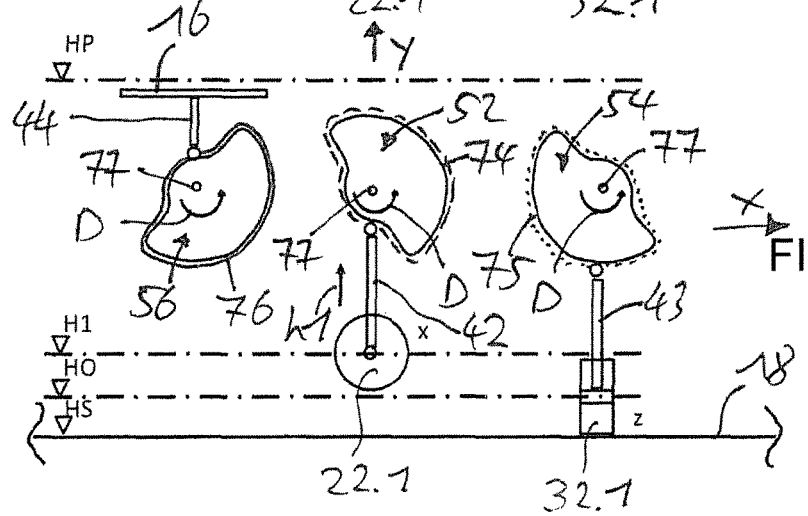

FIGS. 34A-C in conjunction with FIGS. 7A-F illustrate, in highly schematized form, the lifting apparatus with an x lifting device 52 for an x wheel unit 22, a z lifting device 54 for a z wheel unit 32.1 and a y lifting device 56 for the pallet pickup unit 16. The lifting devices 52, 54, 56 are formed by an x disk cam 74, a z disk cam 75 and a y disk cam 74, which are arranged on a common axis of rotation 77 so as to be rotatable in the direction of rotation D and are coupled via schematically illustrated x/z/y coupling elements 42, 43, 44 to the wheel units 22.1 and 32.1 and pallet pickup unit 16, respectively. The coupling elements 42, 43, 44 which are displaceable in a height-displaceable manner (in the y direction) are respectively supported on the circumferential contour of the associated disk cam 74, 75, 76, and therefore, in the event of a corresponding rotation D of the disk cams, the x wheel unit 22.1, the z wheel unit 32.1 and the pallet pickup unit 16 carry out a lifting movement in a temporal sequence. FIGS. 7 and 34 illustrate the curve geometry of the y disk cam 76 with a solid line, the z disk cam 75 with a dotted line and the x disk cam 74 with a dashed line. The height level of the travel route 18 is indicated by HS.

In FIG. 34, the disk cams which, in the exemplary embodiment, are one behind another on a common axis of rotation 77 are illustrated apart from one another in the individual respective rotational positions for the sake of clarity.

According to FIGS. 7A and 34A, the x wheel unit 22.1 is initially in contact with the travel route 18. The axis of rotation of the x wheel unit 22.1 is located here at the height level H0. In this state, moving of the pallet transport apparatus in the x direction is possible. The z wheel unit 32.1 is located at the height level H1 and, in this state, is not in contact with the travel route 18. The pallet pickup unit is located at the height level HP.

If it is now intended for a change of direction of the travel movement from the x into the z direction to take place—when stationary—the rotational shaft 77 is set into rotation D counterclockwise via the lifting drive assembly 50, as a result of which the z wheel unit 32.1 is first of all lowered downward onto the travel route 18 (height level HS). This state is illustrated in FIGS. 7B and 34B. By further rotations D of the axis of rotation 77, the x wheel unit 22.1 is raised in the y direction to the height level H0 because of the curve geometry of the x/z disk cam 52, 54, and therefore, as a result, the z wheel unit 32.1 is then in contact with the travel route 18 and the pallet transport apparatus 10 can be moved in the z direction. During the rotational movement mentioned, the pallet pickup unit 16 is in the retracted, lower height position HP without a vertical displacement occurring.

According to the illustration in FIG. 1, the lifting devices 52, 54, 56 described are present in each corner region of the chassis 14 of the pallet transport apparatus 10 and are coupled in terms of movement in the vertical direction to the respectively adjacent x wheel unit 22 or z wheel unit 32 via the x/z disk cam 74, 75. The pallet pickup unit 16 is likewise coupled in terms of height in the four corner points via its own z disk cam 75.

Figure 8A:
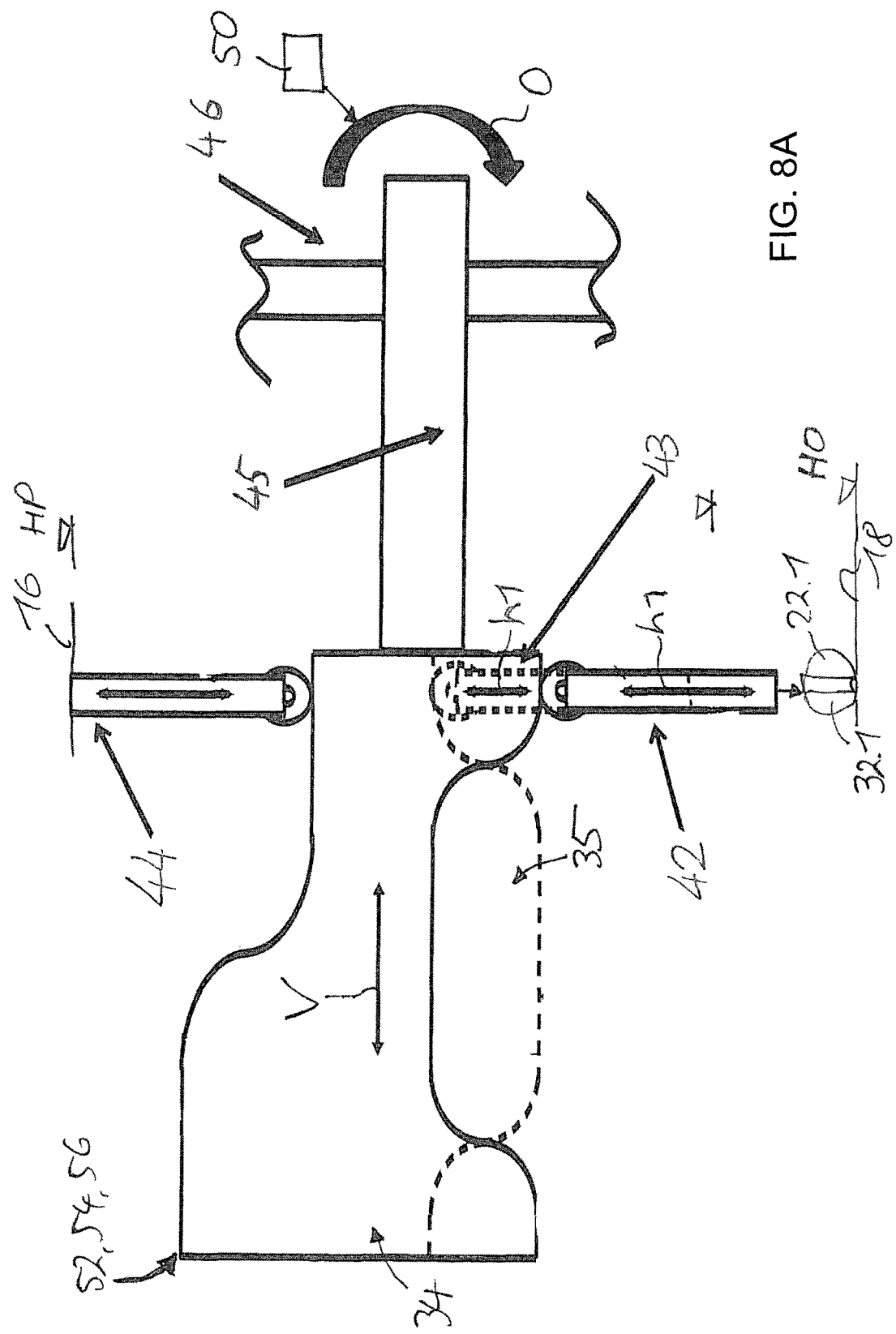
FIGS. 8A and 8B show a highly schematized illustration of a lifting mechanism for the wheel units and the pallet pickup unit, designed as a displaceable connecting link device, in a side view (FIG. 8A) and a top view (FIG. 8B)

FIGS. 8A and b illustrate, in highly schematized form, an alternative refinement of the lifting devices 52, 54, 56 which are designed as displaceable connecting link units 34, 35 which are coupled to a lifting drive assembly 50 which correspondingly brings about the displacement V of the connecting link units 34, 35 in order to bring about the lifting movement of the traveling mechanisms 20, 30 or of the wheel units 22, 32. The connecting link unit 34 is designed here as a connecting link disk, the lower contour of which controls the lifting movement of the x wheel units 22 and the upper contour of which controls the lifting movement of the pallet pickup unit 16. The connecting link unit 34 therefore constitutes x/z lifting devices 52, 56 as it were.

The lifting devices 52, 54, 56 are therefore formed by the x connecting link disk 34 and z connecting link disk 35, which are mounted in a longitudinally displaceable manner V and, in the displacement direction, each have a connecting link contour to which the coupling elements 42, 43 for the x wheel unit 22 and z wheel unit, respectively, are connected in terms of contact. The x connecting link disk 34 has, on the upper side, a further profiling which is coupled to the coupling elements 44 for the pallet pickup unit 16. In the event of a longitudinal displacement of the disk cams 34, 35, the x wheel units 22 or z wheel unit 32 and the pallet pickup unit 16 carry out a lifting movement corresponding to the receptive connecting link disk contour, the temporal sequence and size of which lifting movement corresponds to the movement sequence as described with respect to FIGS. 7 and 34. The respective longitudinal displacement V is brought about by the connecting link disks 34, 35 being coupled to a spindle nut 46 of a spindle 45, and the spindle 45 itself being set into a rotational movement D via the lifting drive assembly in order to conduct the displacement movement of the connecting link disks 34, 35 by the resulting lifting movements of the wheel units 22, 32 into the routes.

Figure 9:
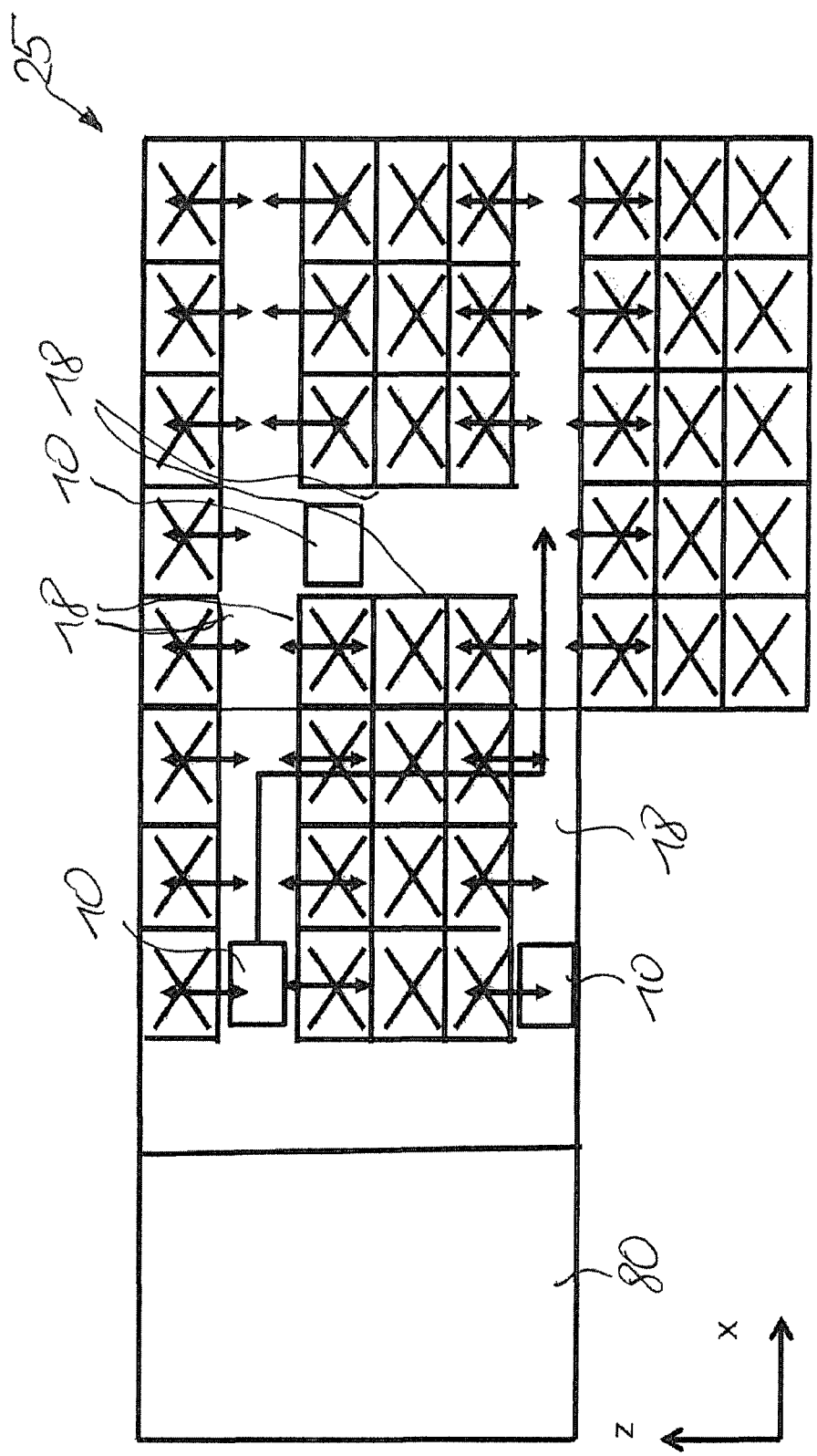
FIG. 9 shows a highly schematized top view of a rack system with a pre-zone and the transport routes for the pallet transport apparatus within the rack system.

FIG. 9 shows, in highly simplified form, the top view of a rack system 25 which is formed in said orthogonal system x/z with respect to the travel routes 18 of the pallet transport apparatus 10 and, furthermore, comprises a pre-zone 80, within which the pallet transport apparatuses 10 illustrated can also be moved without being connected to the orthogonal travel route system x-z of the actual rack system 25, as is described further below.

Figure 10:
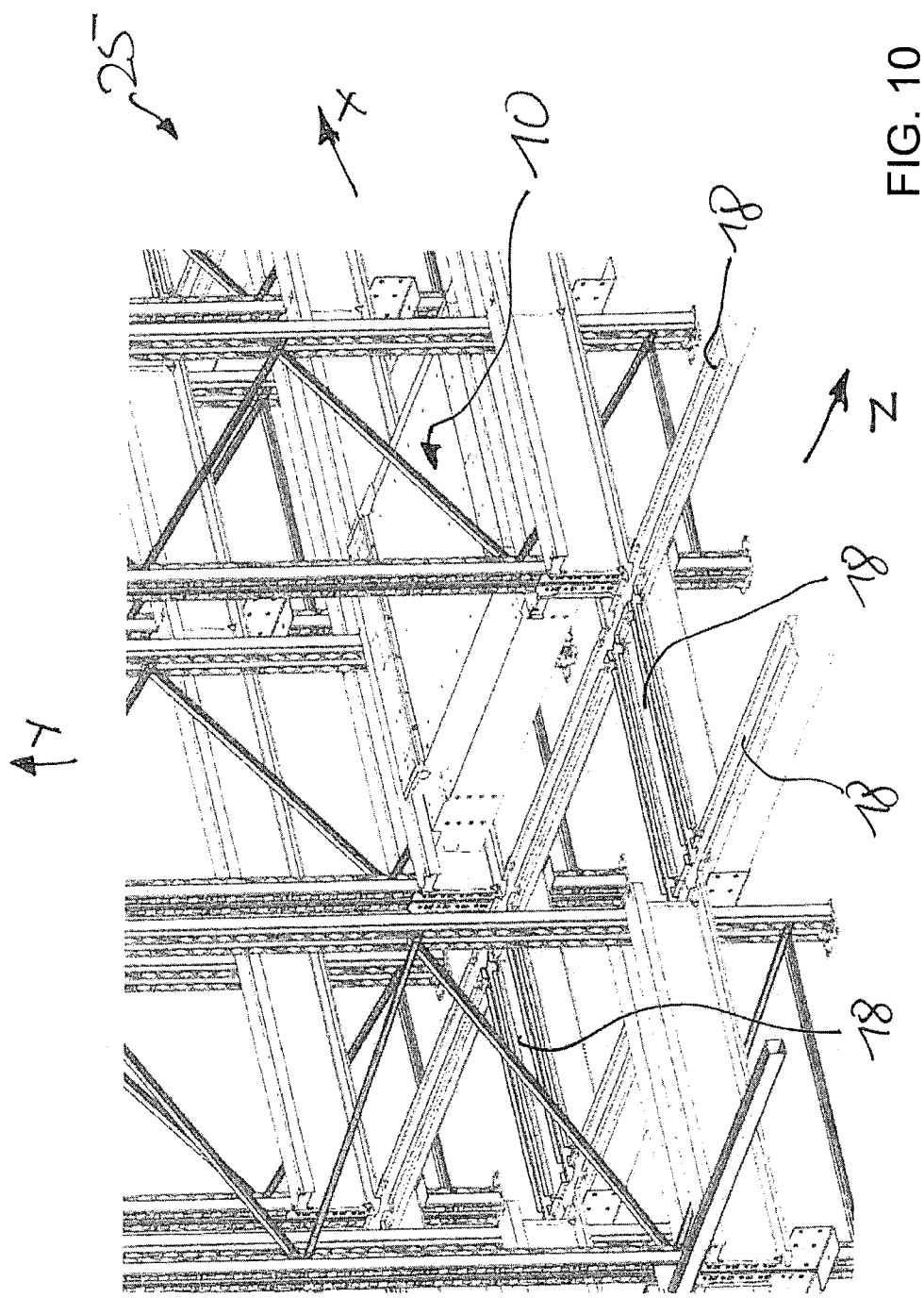
FIG. 10 shows a highly schematized perspective illustration of a detail of a structure of a rack system with orthogonal travel routes, along which a pallet transport apparatus can move.

FIG. 10 illustrates, in a perspective cutout of a detail, a rack system 25 which is formed in an orthogonal grid x, y, z, wherein the supporting system consists of individual profiles which are arranged in the x, y and z direction and form travel routes, within which the pallet transport apparatus 10 according to the invention is present so as to be movable in the x and z direction.

Figure 11:
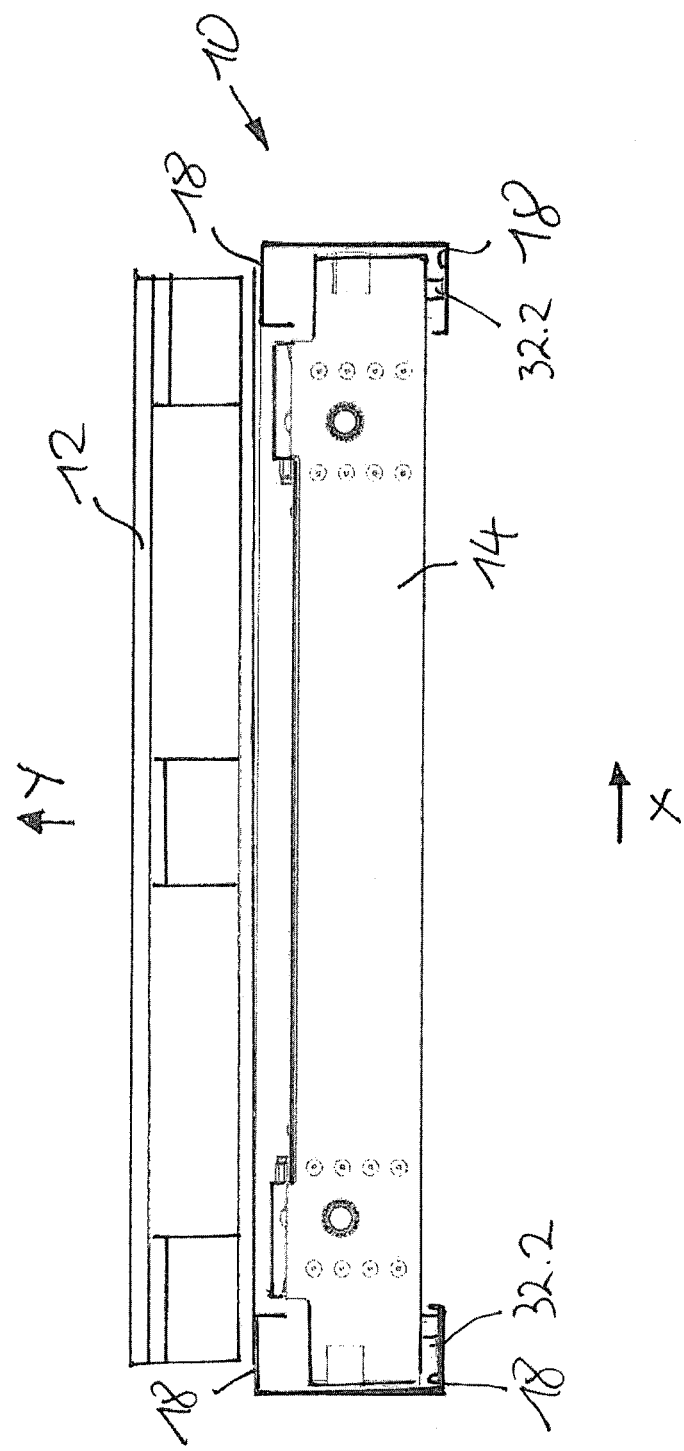
FIG. 11 shows a side view of a final construction of a pallet transport apparatus with a picked-up pallet unit.

FIG. 11 shows, in a side view, a structural exemplary embodiment of a pallet transport apparatus 10 with a pallet 12 placed thereon. The pallet 12 is suitable for receiving a loaded article (not illustrated specifically in FIG. 11) individually. The pallet transport apparatus 10 illustrated in FIG. 11 is equipped, corresponding to the previous description, with independent lifting devices in the x, z and y direction, which lifting devices can be approached separately and in a controlled manner via corresponding drive assemblies in order to change the travel direction x, z or to raise or lower the pallet pickup unit 16 as required.

Figure 8B:
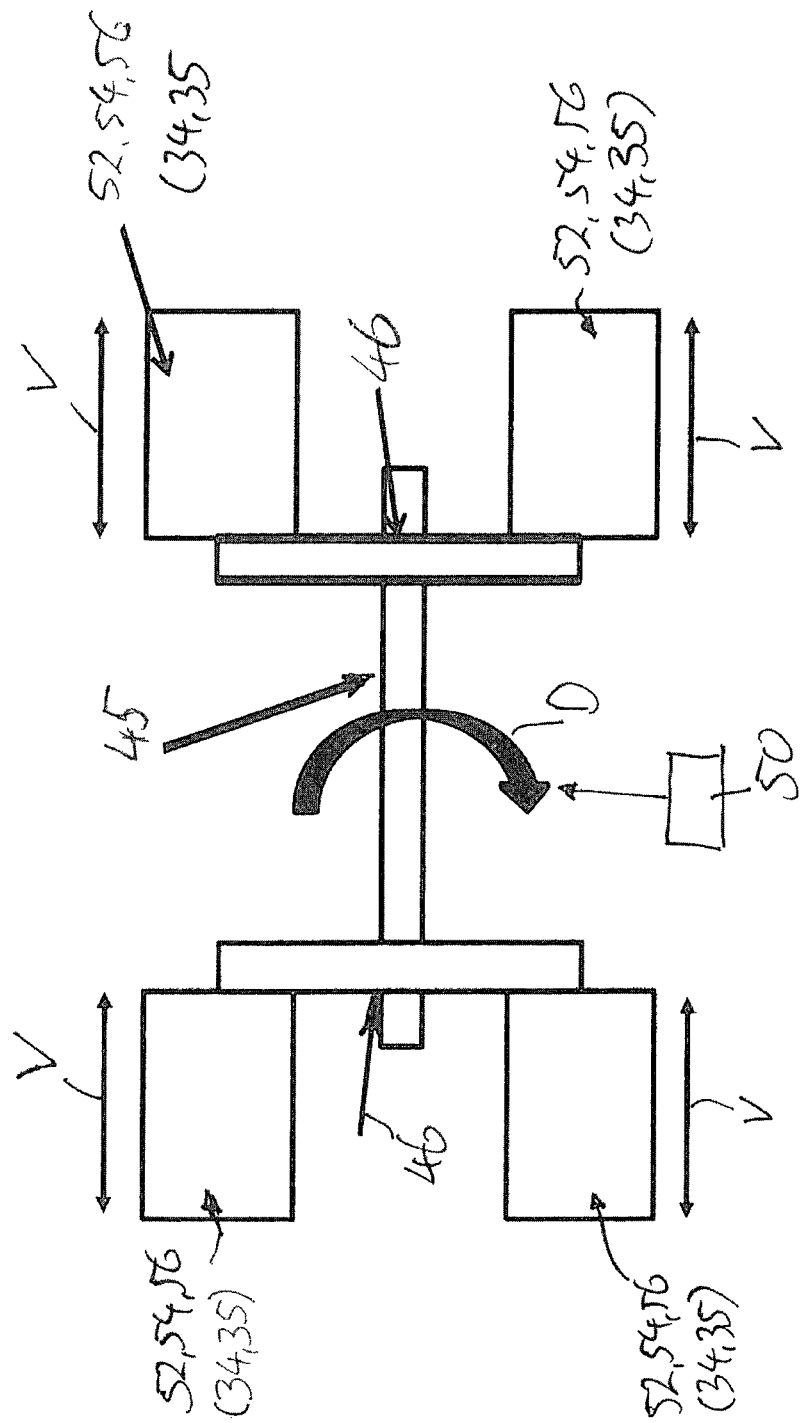

In the case of the lifting devices according to FIGS. 7 and 8, each x and z wheel unit 22, 32 is assigned, according to the schematized illustration in FIG. 1, to a respective lifting device which is driven by a central lifting drive assembly 50.

FIGS. 20 to 32 illustrate structural refinements of the lifting devices for the x and z wheel units 22, 32, which are based on the principle illustrated in FIG. 3, that is to say, there is an x lifting drive assembly 50.1 for the x wheel units 22.1, 22.2 on both sides and a z lifting drive assembly 50.2 for the z wheel units 32.1, 32.2 on both sides.

Figures 20A, 20B:
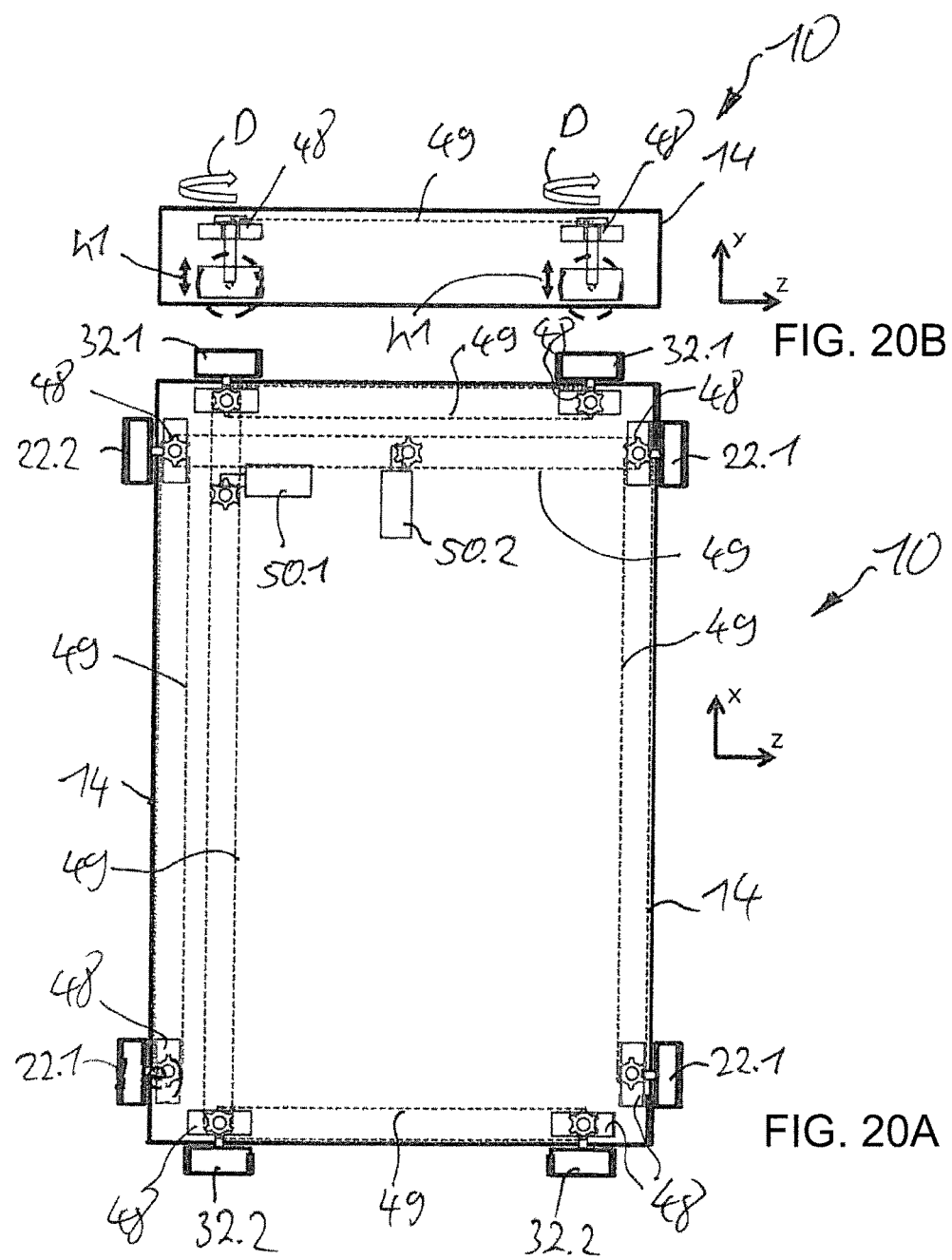

According to the exemplary embodiment illustrated in FIG. 20, each x wheel unit 22 and each z wheel unit 32 is assigned, for height adjustment, a wheel spindle unit 48, wherein the coupling of the x and z wheel units 22, 32 to one another can take place via chains or belts 49 or else via a shaft, and this manner of coupling is likewise also used for the coupling of the lifting drive assemblies 50.1 and 50.2. By activating the x lifting drive assembly 50.1, therefore all of the x wheel units 22, and by activating the z lifting drive assembly 50.2, for all of the z wheel units 32 carry out a corresponding vertical movement. This variant embodiment according to FIG. 20 is distinguished by a direct force flow and permits a lightweight construction, wherein the construction principle is of identical design both for the x and the z wheel units 22, 32.

The construction illustrated in FIG. 21 differs from the construction according to FIG. 20 in that a respective spindle unit 48 is inserted into the x/z side, said spindle unit being coupled to an x connecting profile 38 or to a z connecting profile 39, to the end regions of which the x or z wheel unit 22, 32 is in each case connected. As a result, fewer parts are required and a relatively free construction space arises for the wheel drive.

The wheel spindle units 48 are coupled to one another and to the associated lifting drive assembly 50.1, 50.2 via a toothed belt 49, for example.

Figures 22A, 22B:
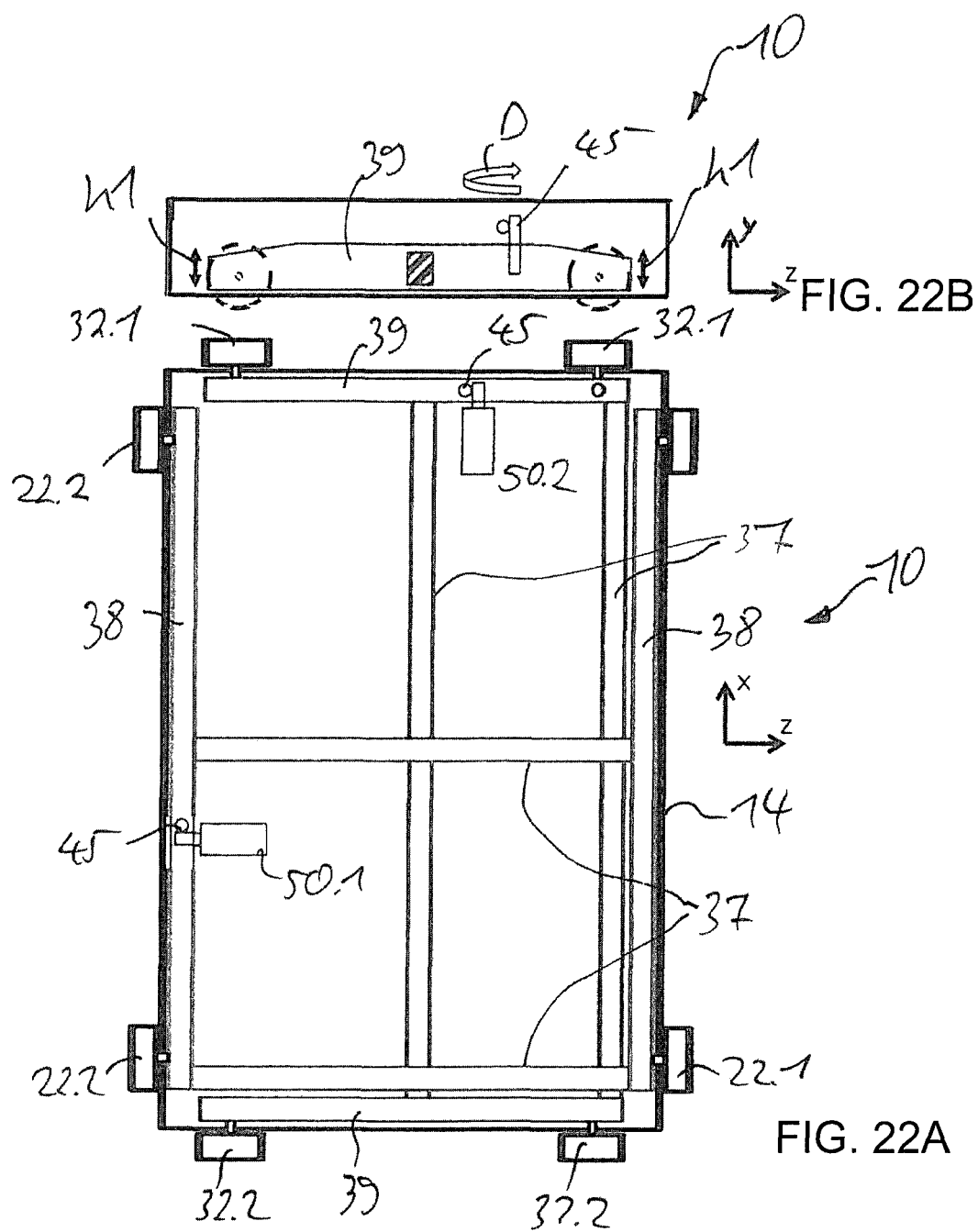

In the structural refinement according to FIG. 22, there is in each case one x connecting profile 38 or one z connecting profile 39 per side, said connecting profile coupling the wheel units 22, 32 to each other, wherein the connecting profiles 38, 39 are connected via frame profiles 37 to form a stiff frame. A spindle 45 is arranged here directly on an x connecting profile 38 and directly on a z connecting profile 39, on which spindle the associated lifting drive assembly 50.1 or 50.2 directly acts.

Figures 23A, 23B:
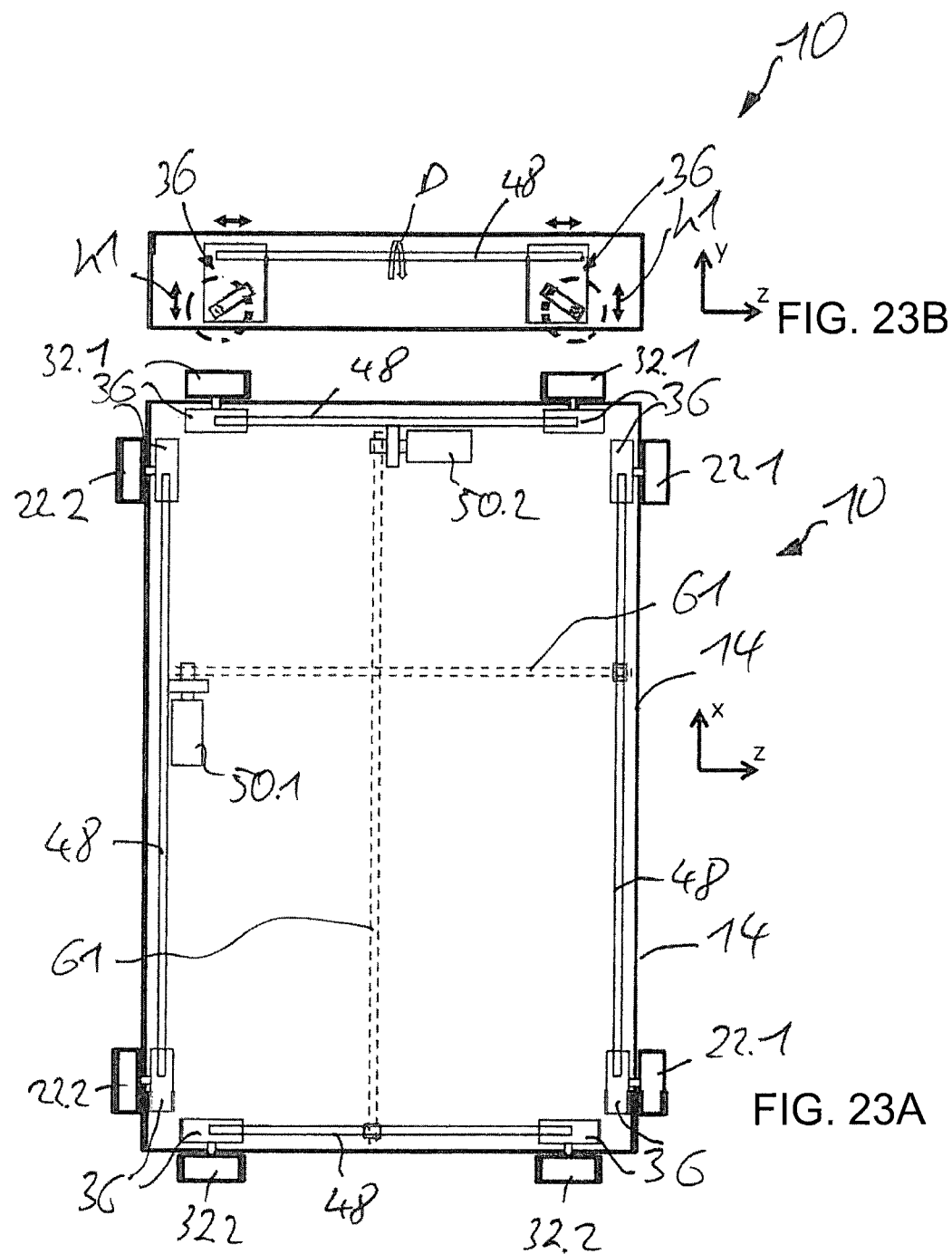

In the structural refinement according to FIG. 23, in each case one spindle unit 48 in combination with a connecting links 36, to which the wheel units 22, 32 are coupled, is used per wheel side. The opposite spindle units 48 are coupled via a toothed belt 61.

By rotation D of the spindle unit 48, the connecting link 36 is displaced and the height of the associated wheel unit 22, 32 is adjusted via an articulated lever.

Figures 24A, 24B:
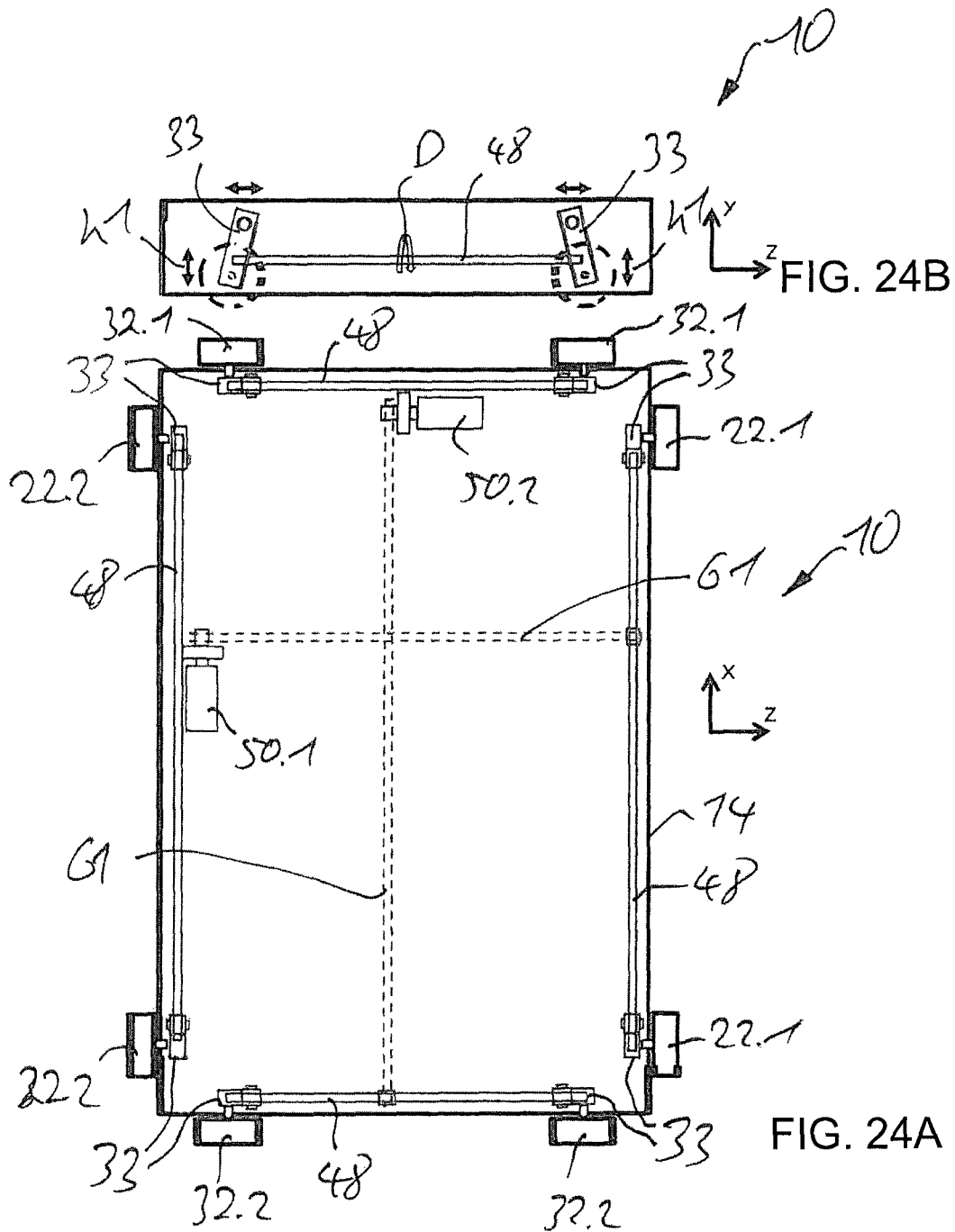

In the structural refinement according to FIG. 24, in addition to a spindle unit 48, use is made of a rotary lever 33 which is connected in the respective end region to the spindle unit 48, is coupled to the wheel unit 22 or 32, is articulated on the chassis 14, and the rotation of which brings about a height displacement of the wheel units 22, 32.

Figures 25A, 25B:
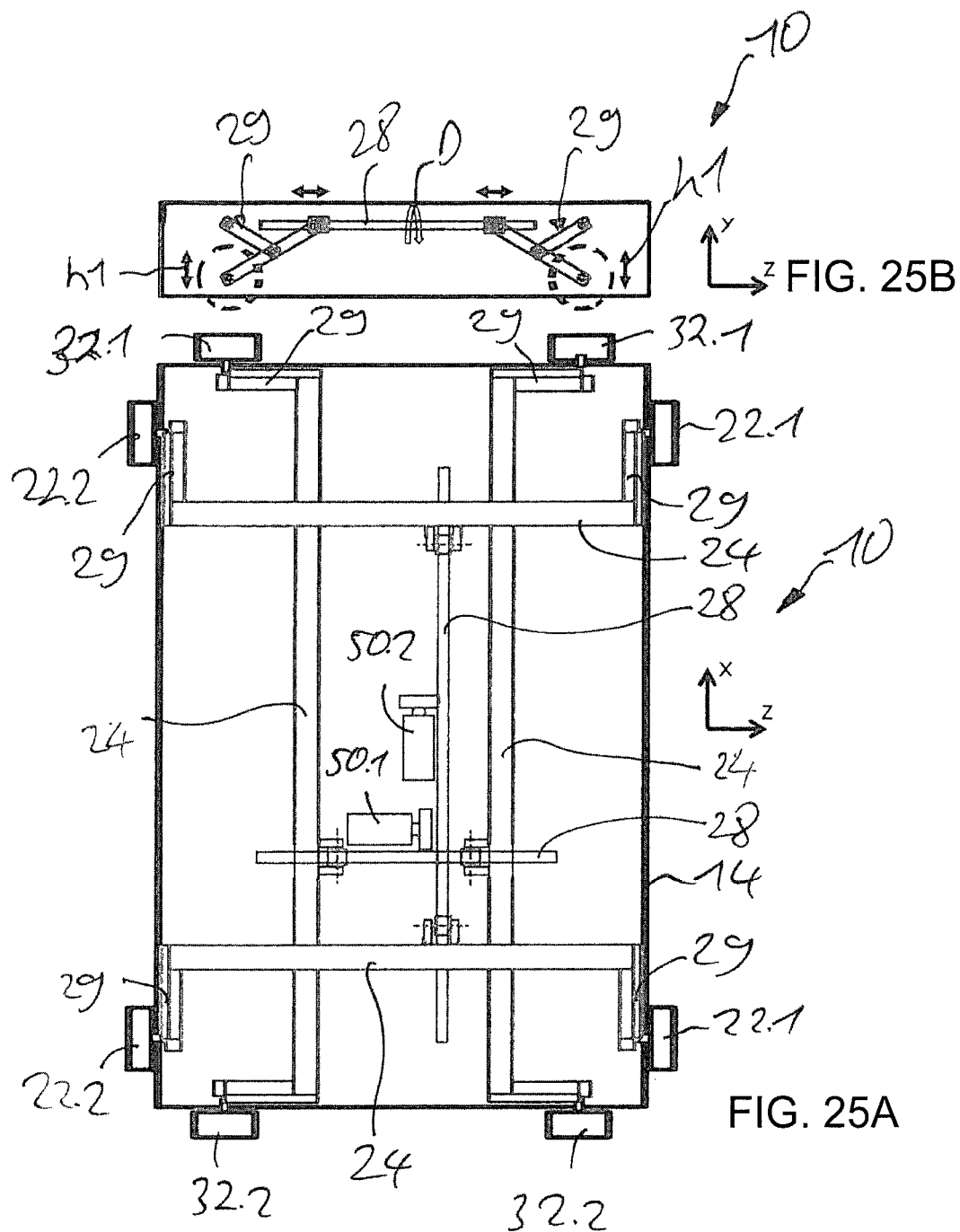

FIG. 25 shows a structural exemplary embodiment in which use is made of a double spindle unit 28 which is coupled to the wheel units 22, 32 in each case via a scissors mechanism 29 which, upon rotation D of the double spindle unit 28, brings about a height displacement H1 of the wheel units 22 or 32. The scissors mechanisms 29 of opposite sides are coupled to each other here via a connecting profile 24. The double spindle unit 28 acts in terms of displacement on said connecting profile 24. This solution has the advantage that only one spindle drive is required in each case for the x and z wheel units 22, 32. The spindle height position does not vary when the lifting movement is carried out, and no change in position of the wheel units takes place.

Figure 35:
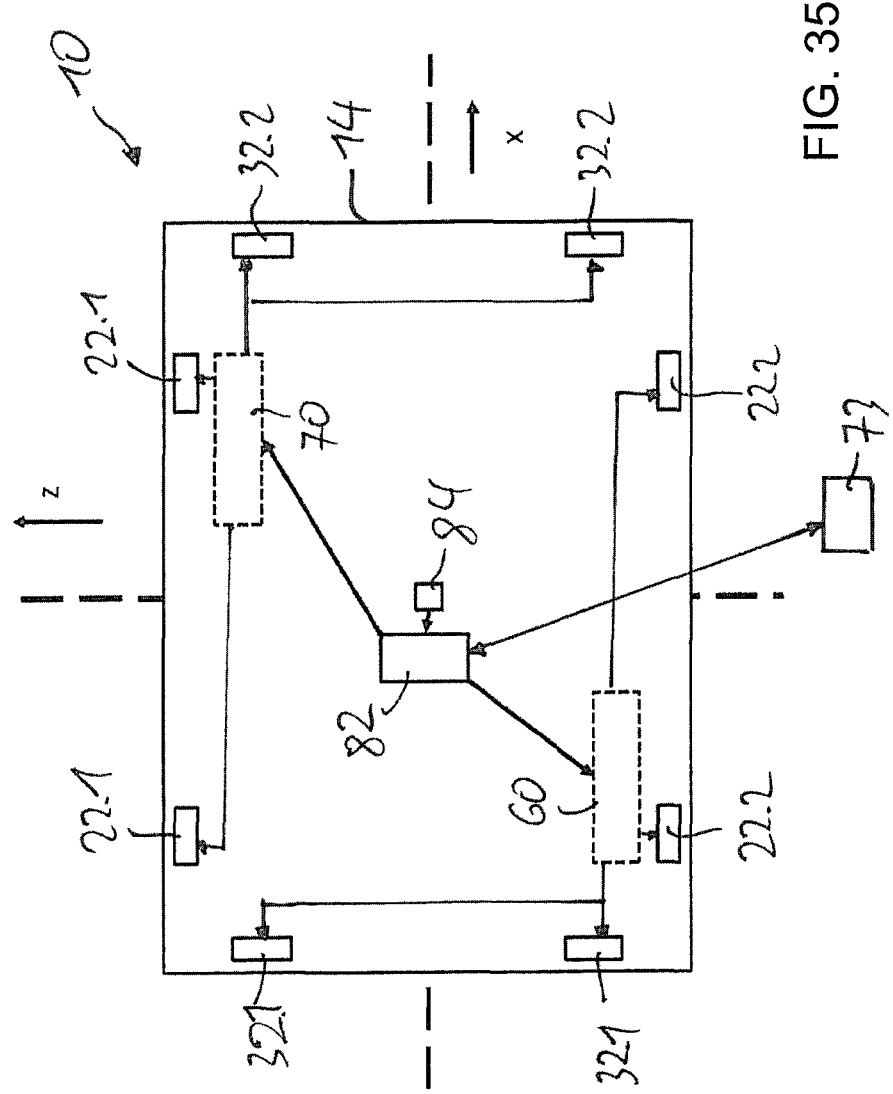
FIG. 35 shows a highly schematized illustration of a top view of the pallet transport apparatus according to FIG. 33 with only one sensor unit.

The structural exemplary embodiment illustrated in FIG. 26 differs from the exemplary embodiment illustrated in FIG. 35 in that, instead of the single scissors mechanism 29, there is a double scissors mechanism 23 which increases the stability.

Figures 27A, 27B:
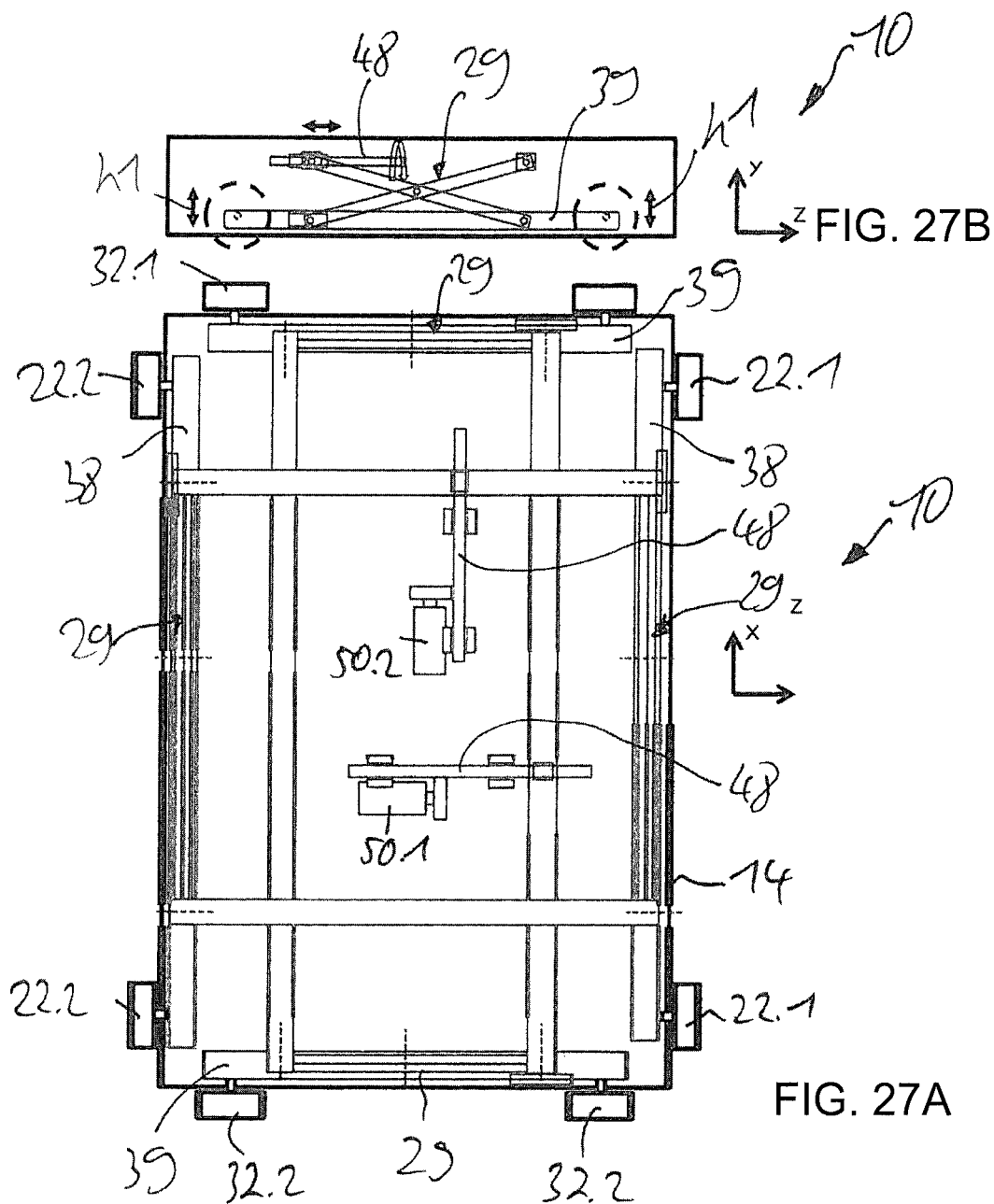

The embodiment according to FIG. 27 likewise has a scissors mechanism 29 which, however, is arranged centrally per side, wherein, on each side, there is an x connecting profile 38 or a z connecting profile 39 which is connected in an articulated manner to the scissors mechanism 29 and connects the associated wheel units 22, 32 per side to each other.

Figures 28A, 28B:
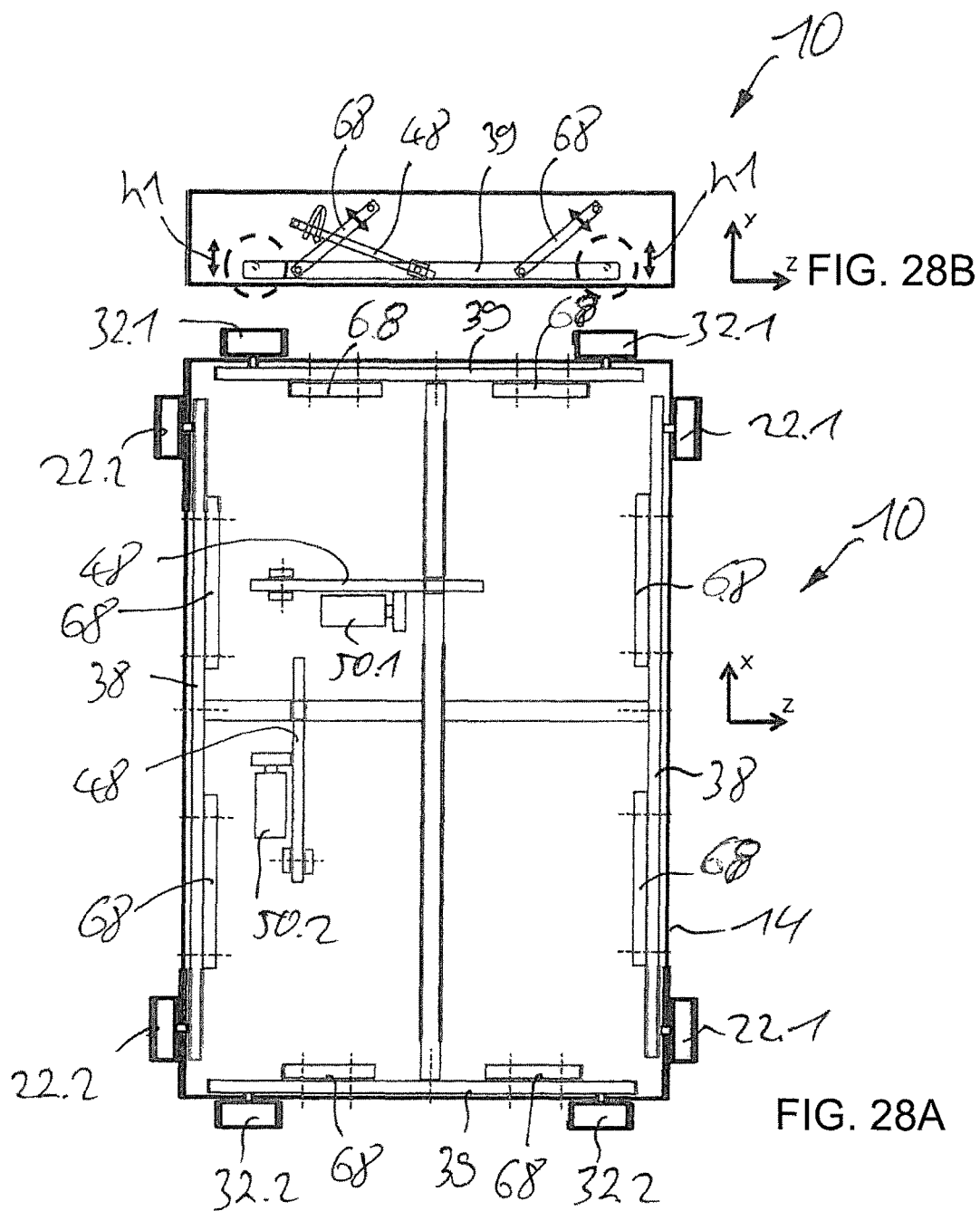

The structural variant embodiment according to FIG. 28 likewise has an x and a z connecting profile 38, 39 on which the spindle unit 48 acts, wherein the connecting profiles 38 are in each case movable via two double levers 68, which are connected in an articulated manner in parallel, in order to realize the vertical movement of the wheel units 22, 32 when the spindle unit 48 is activated.

The structural variant embodiment according to FIG. 29 shows one toggle lever mechanism 69 per wheel side unit, the toggle lever mechanism being articulated in each case on a connecting profile 38 or 39 connecting the wheel units 22 or 32. A spindle unit 48 which brings about a displacement movement of the toggle lever mechanism 69 on both sides and therefore a vertical movement H1 of the wheel units 22 or 32 acts centrally per side on the toggle lever mechanism 69. The toggle lever mechanism 69 of opposite sides can be coupled to each other via a rigid connection or a chain or a belt 49.

Figures 30A, 30B:
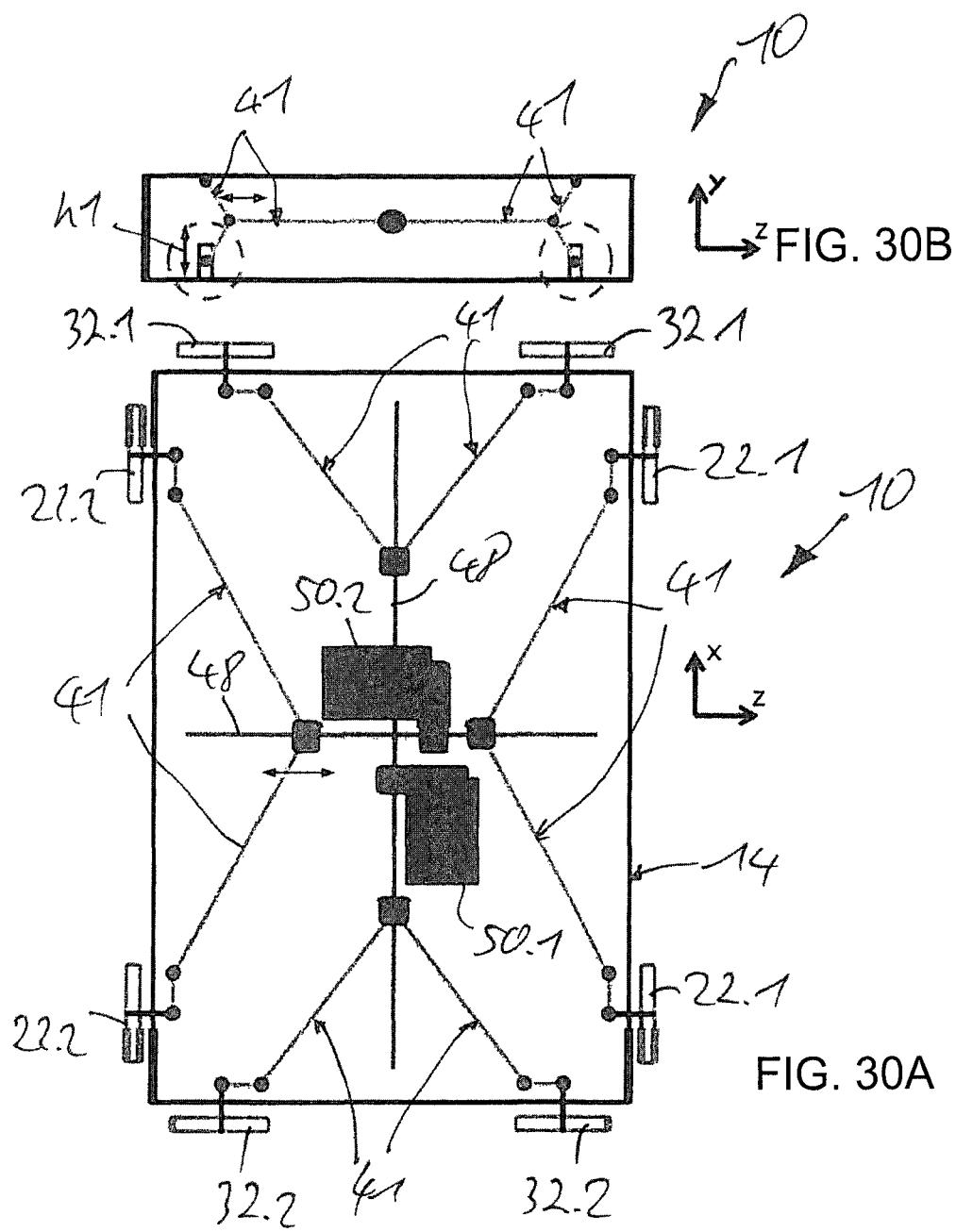

The structural refinement according to FIG. 30 shows the use of a double spindle unit 28 to which a horizontally arranged toggle lever mechanism 41 is connected for each wheel unit in an associated x or z direction, via which toggle lever mechanism the vertical movement h1 of the wheel units 22, 32 takes place.

FIG. 31 shows a structural variant embodiment in which in each case one double spindle unit 28 is used per side, the double spindle unit being connected via a respective connecting profile 24 to a displaceable wedge unit 27, wherein a coupling member 26 is connected to the x connecting profile 38 or to the z connecting profile 39 of the wheel units 22 or 32 on the lower side of each wedge unit 27, and therefore a vertical movement of the wheel units 22, 32 takes place by displacement of the wedge unit 27.

Figure 32:
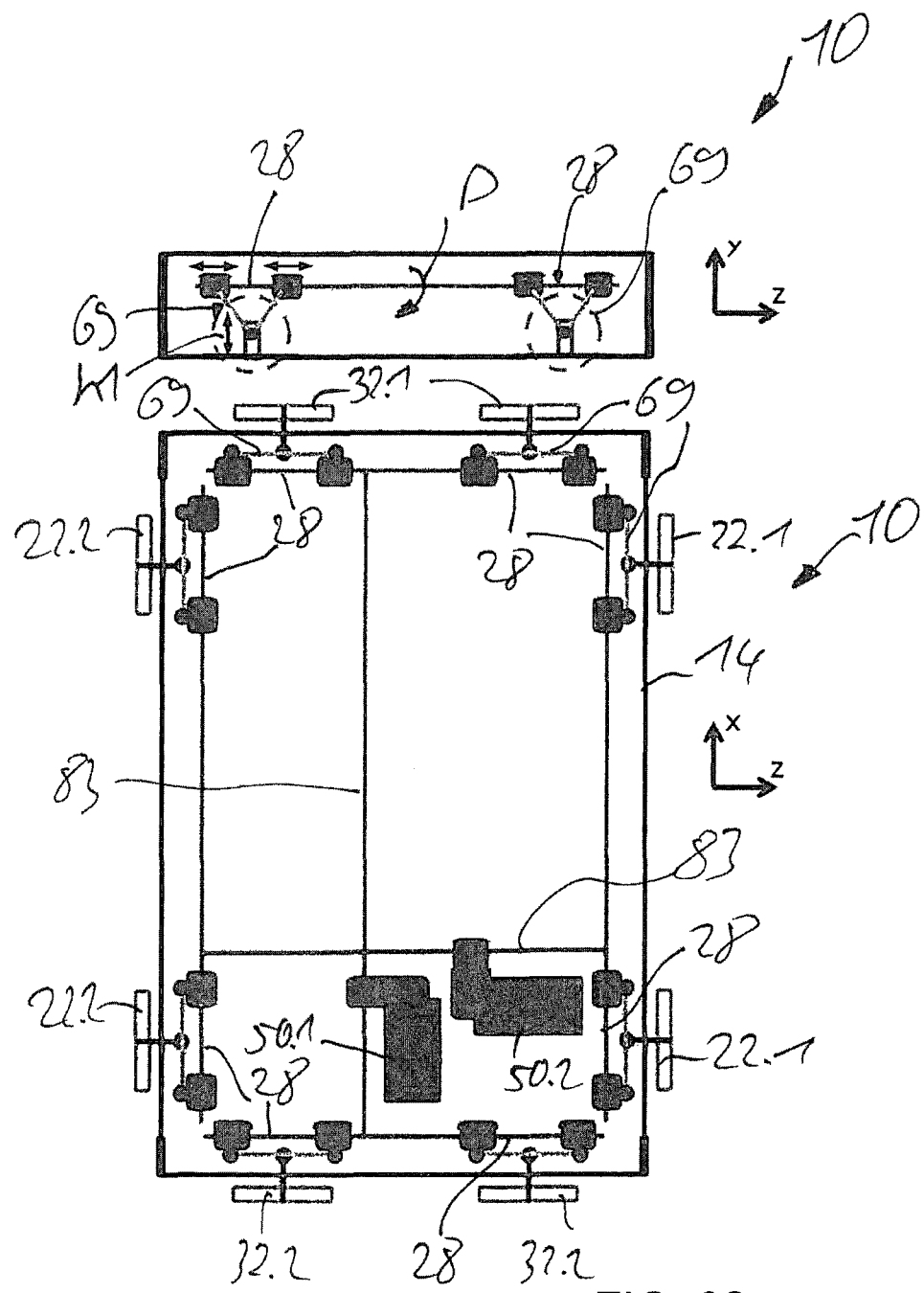

FIG. 32 finally shows a solution in which for each wheel unit 22, 32 use is made of a double spindle unit 28 on which a toggle lever mechanism 69 is articulated for each wheel unit. The double spindle units 28 are driven by a drive shaft 83 via the lifting drive assemblies 50.1, 50.2.

In the above exemplary embodiments, various variants of a pallet transport apparatus 10 according to the invention are illustrated, in which, according to the invention, an x traveling mechanism 20 with the x wheel units 22 thereof and a z traveling mechanism 30 with the z wheel units 32 thereof can be raised or lowered to different height levels without a lifting movement of the pallet pickup unit 16 having to take place. The lifting movement takes place here by activating an x lifting device 52 or a z lifting device 54 with a lifting drive assembly or with an x lifting drive assembly 50.1 and a z lifting drive assembly 50.2. The y lifting device 56 for the pallet pickup unit 16 is likewise operated via a lifting drive assembly 50.

Figure 12:
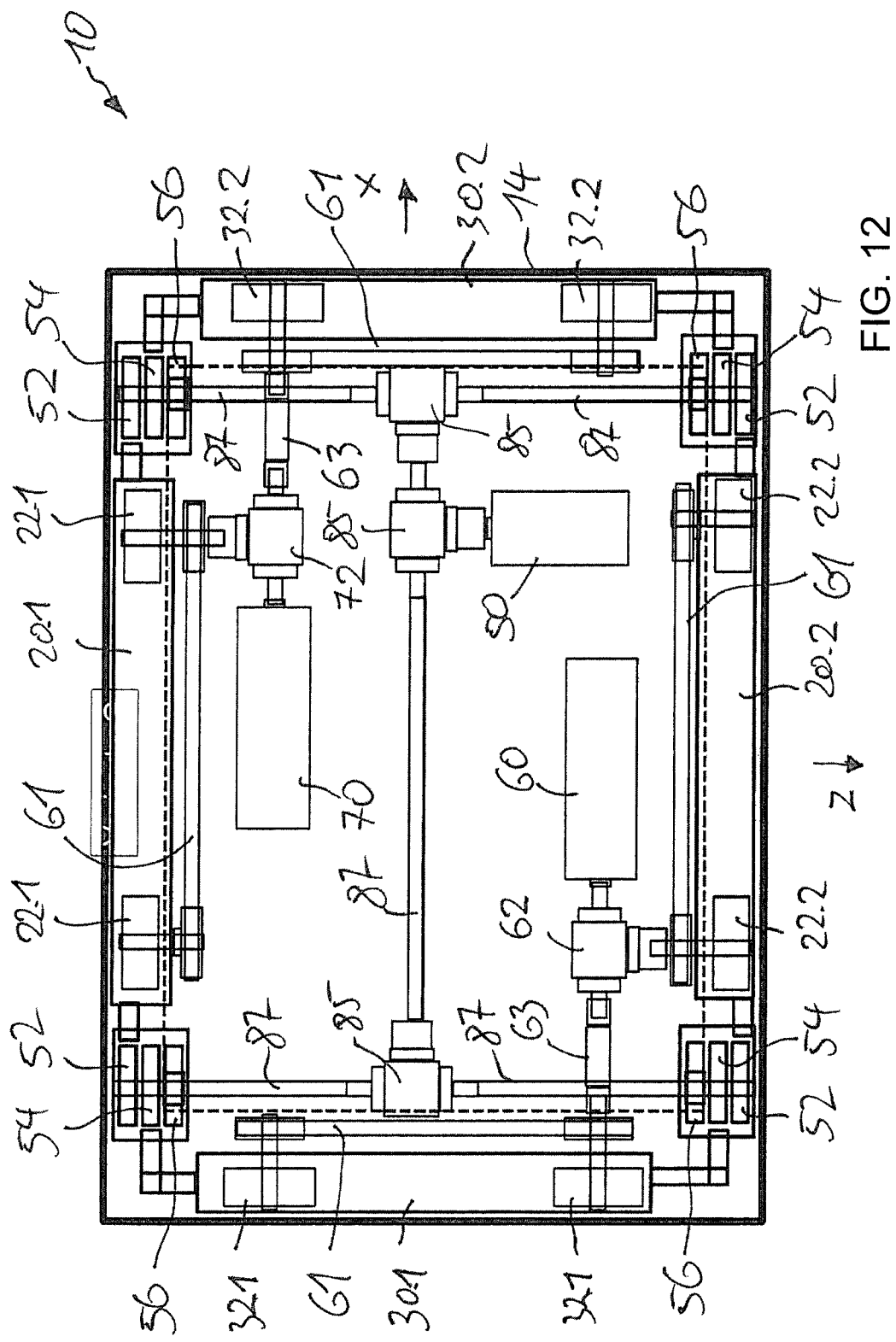
FIG. 12 shows a schematic (transparent) top view of a structural exemplary embodiment of the pallet transport apparatus according to FIGS. 1 and 2.

FIG. 12 shows a schematized top view through a pallet transport apparatus 10 according to the invention with a lifting drive assembly for all of the traveling mechanisms and wheel units, and two travel drive assemblies 60, 70 for driving the x/z wheel units 22, 32 in the respectively required x or z direction of the rack system.

Independently or in combination with the above-illustrated solutions, structural variant embodiments of a pallet transport apparatus 10 according to the invention are illustrated in FIGS. 13 to 19, in which the x traveling mechanisms 20 and x wheel units 22 and the z traveling mechanism 30 and the z wheel units 32 can be positioned in a different vertical direction (y direction)—depending on the travel direction x or z sought, wherein, however, according to the invention, use is made only of two travel drive assemblies, namely a first travel drive assembly 60 and a second travel drive assembly 70, wherein each of the travel drive assemblies 60, 70 is coupled in terms of drive to a right x traveling mechanism 20.1 or right x wheel units 22.2 and to a left z traveling mechanism 30.1 or left z wheel units 32.1. Since the traveling mechanisms and the wheel units can be arranged in different vertical positions, there are coupling units between the travel drive units 60, 70 that can realize in terms of drive a height compensation between the respective left x traveling mechanism 20.1 and the right z traveling mechanism 30.2.

Figure 13:
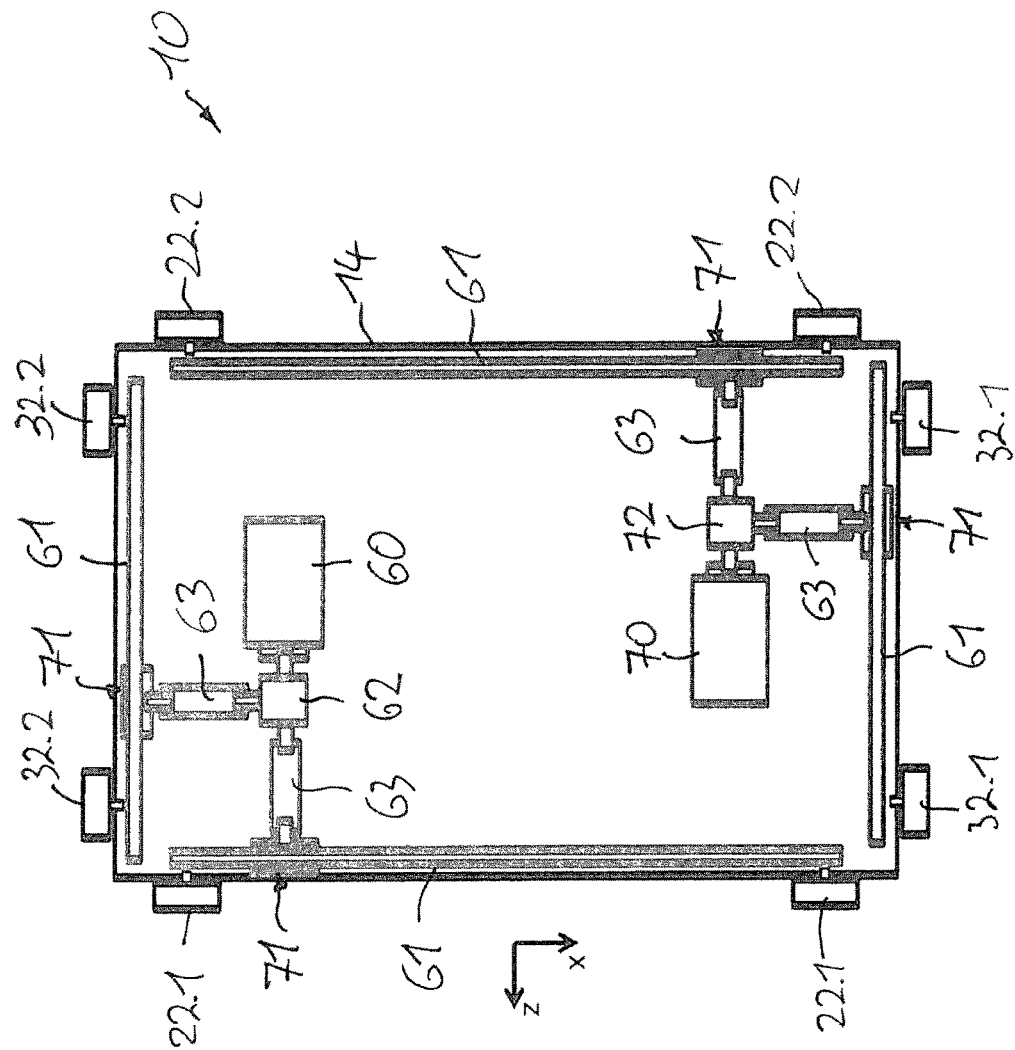
FIG. 13 shows a highly schematized illustration of a top view of an exemplary embodiment of a pallet transport apparatus with height-displaceable x/z traveling mechanisms or x/z wheel units, with two travel drive assemblies for driving all of the wheel units, wherein each travel drive assembly drives a side with x/z wheel units via corresponding coupling devices.

FIG. 13 shows a structural exemplary embodiment in which the first travel drive assembly 60 and the second travel drive assembly 70 are present in a positionally fixed manner. The left and right x wheel units 22.1, 22.2 and the left and right z wheel units 32.1, 32.2 are coupled to one another on each side in each case via a toothed belt drive 61. A chain drive may also be used. The coupling construction between the respectively fixed travel drive assembly 60 or 70 takes place via a gearing 62 to which a cardan shaft 63 is in each case connected, said cardan shaft producing in terms of drive a connection in each case to the left x wheel units 22.1 and right z wheel units 32.2 via the intermediate connection of an omega drive 71. By means of the cardan shafts 63, the drive of the x wheel units 22.1 and of the z wheel units 32.2 is always ensured even in a different height position, that is to say the wheel units 22.1, 32.2 are always driven, wherein the x wheel units 22.1 or the z wheel units 32.2, depending on the travel direction, are in contact with the travel route 18. With regard to the right x wheel units 22.2 and the left z wheel units 32.1, the same coupling mechanism is used in conjunction with the second travel drive assembly 70.

This construction always ensures a constant prestressing of the drive belts 61 and permits a simple, positionally fixed fastening of the travel drive assemblies 60, 70 to the pallet chassis 14.

Figure 14:
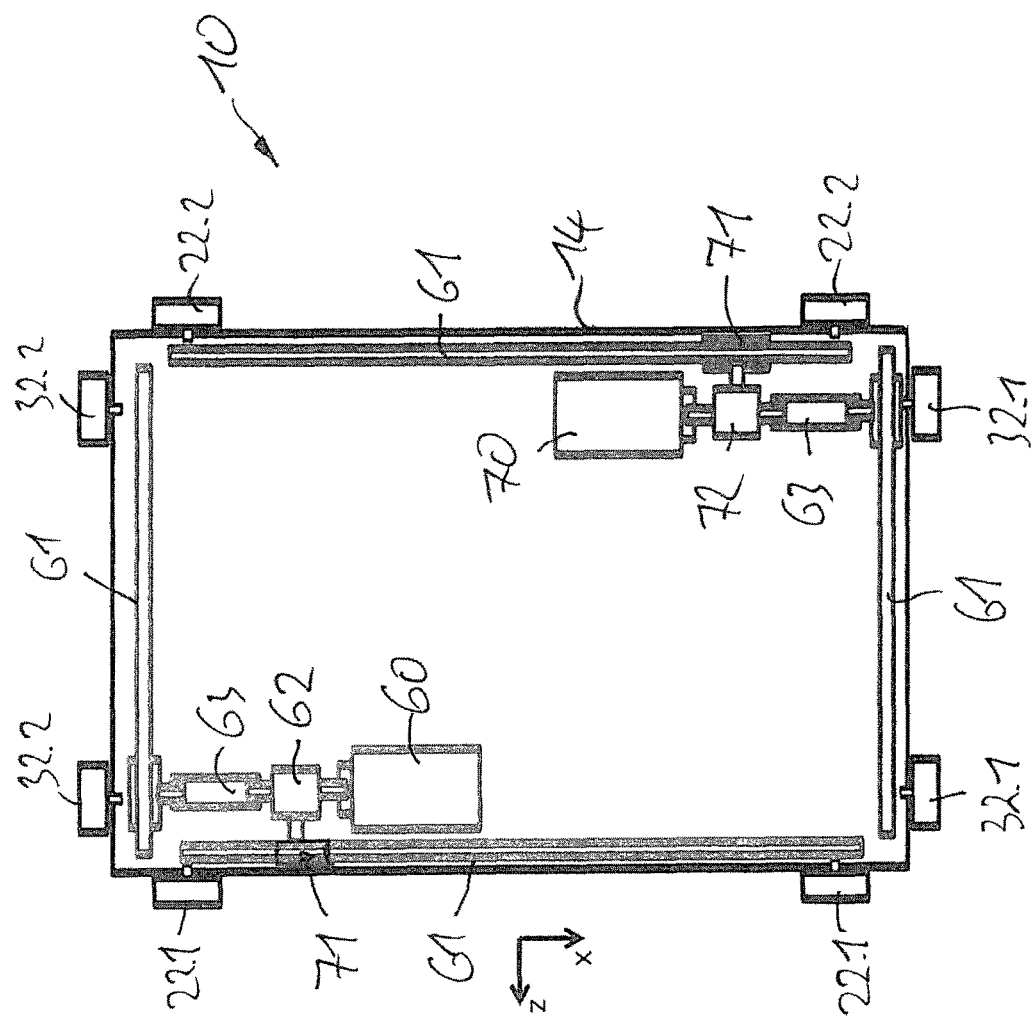

The structural variant embodiment illustrated in FIG. 14 differs from the construction according to FIG. 13 in that the first and second travel drive assembly 60, 70 is fixedly connected to the left x traveling mechanism 20.1 and therefore an intermediately connected cardan shaft can be dispensed with and, with regard to the right z traveling mechanism 32.1, is connected directly in terms of drive via the cardan shaft 63 to a z wheel unit 32.2.

The connection to the left x traveling mechanism or to the left x toothed belt 61 takes place in turn via an omega drive 71.

The right x wheel units 22.2 and left z wheel units 32.1 are correspondingly connected to the same coupling construction via the second travel drive assembly 70.

Figure 15:
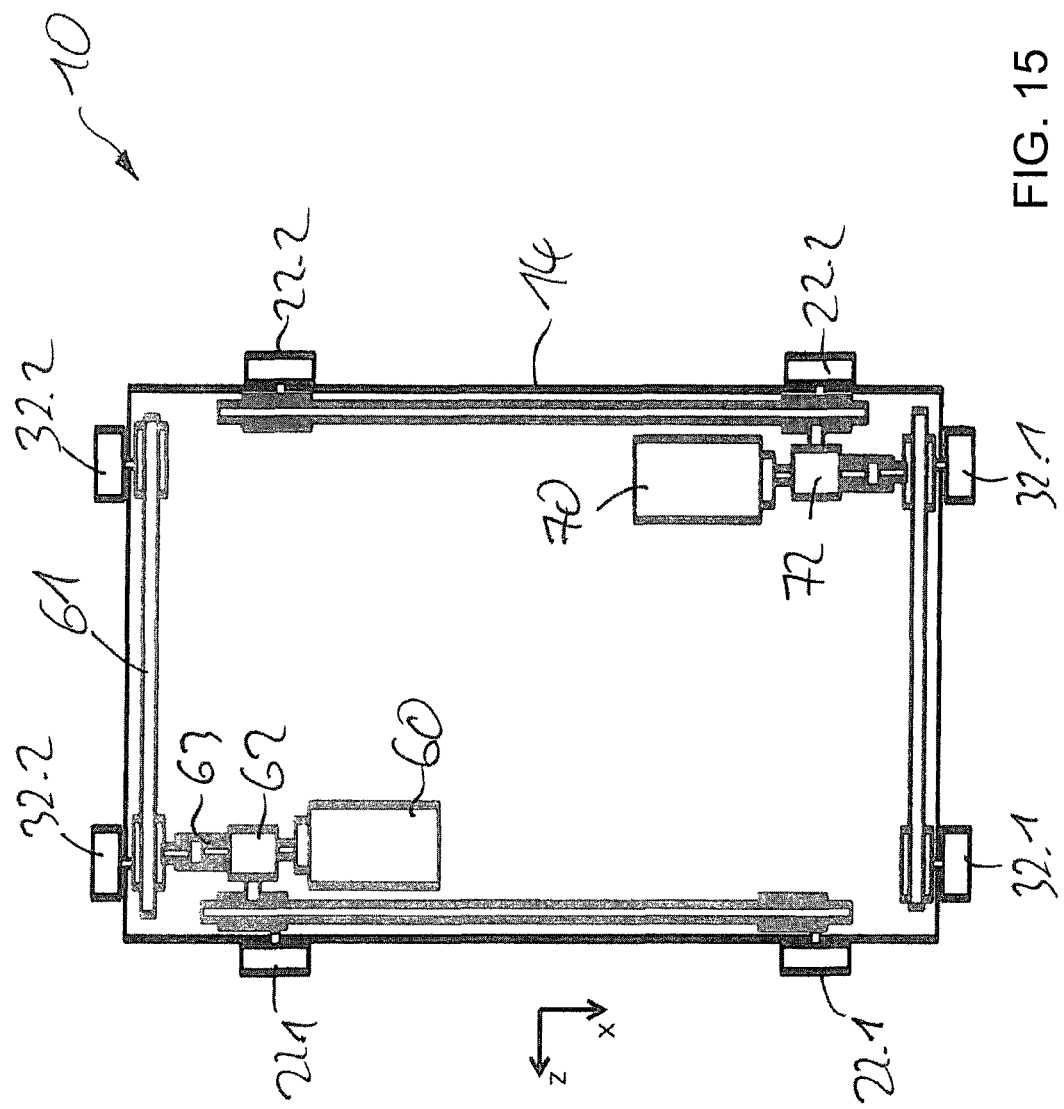

The variant embodiment according to FIG. 15 differs from that according to FIG. 14 in that the gearing 62 of the first travel drive assembly 60 is directly connected to a left x wheel unit without the intermediate connection of an omega drive, and therefore, all in all, no omega drive is required. This particularly preferred embodiment is also illustrated in more detail in FIG. 12, wherein, in addition, the lifting assembly 50, the x, y and z lifting devices 52, 54, 56 and the driving mechanism (according to the schematic drawing in FIG. 1) are illustrated in a structural configuration. The structural realization of the pallet transport apparatus 10 with a single lifting drive assembly 50 and a first travel drive assembly 60 and a second travel drive assembly 70, which basically has a design as per FIG. 1, with the lifting devices 52, 54, 56 being designed as disk cams, emerges in more precise detail from FIG. 12.

Figure 16:
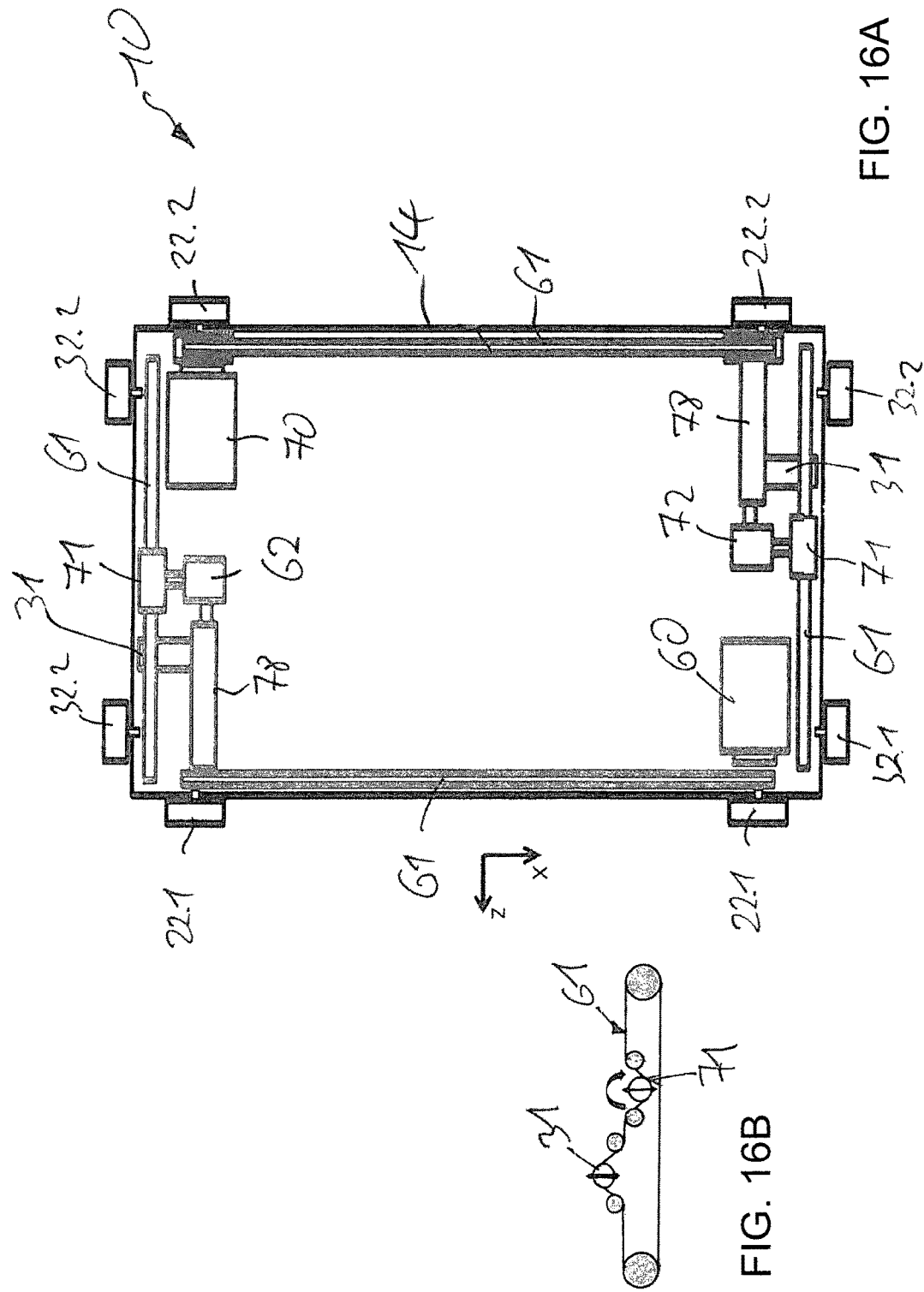

FIG. 16 shows a further structural exemplary embodiment in which the first travel drive assembly 60 acts directly on the left lower x wheel unit 22.1. Said lower x wheel unit 22.1 transmits the rotational movement via the toothed belt 61 to the upper x wheel unit 22.1. A rotary shaft 78 which is connected via a gearing 62 to an omega drive unit 71 for the two right z wheel units 32.2 is connected to said upper x wheel unit 22.1.

Furthermore, there is a prestressing shaft 41 in the toothed belt profile of the upper toothed belt 61 to compensate for stress. The driving situation with regard to the upper toothed belt 61 is illustrated schematically in FIG. 16b.

The first travel drive assembly 60 therefore moves in the vertical direction with the x wheel unit 22.1.

Figure 17:
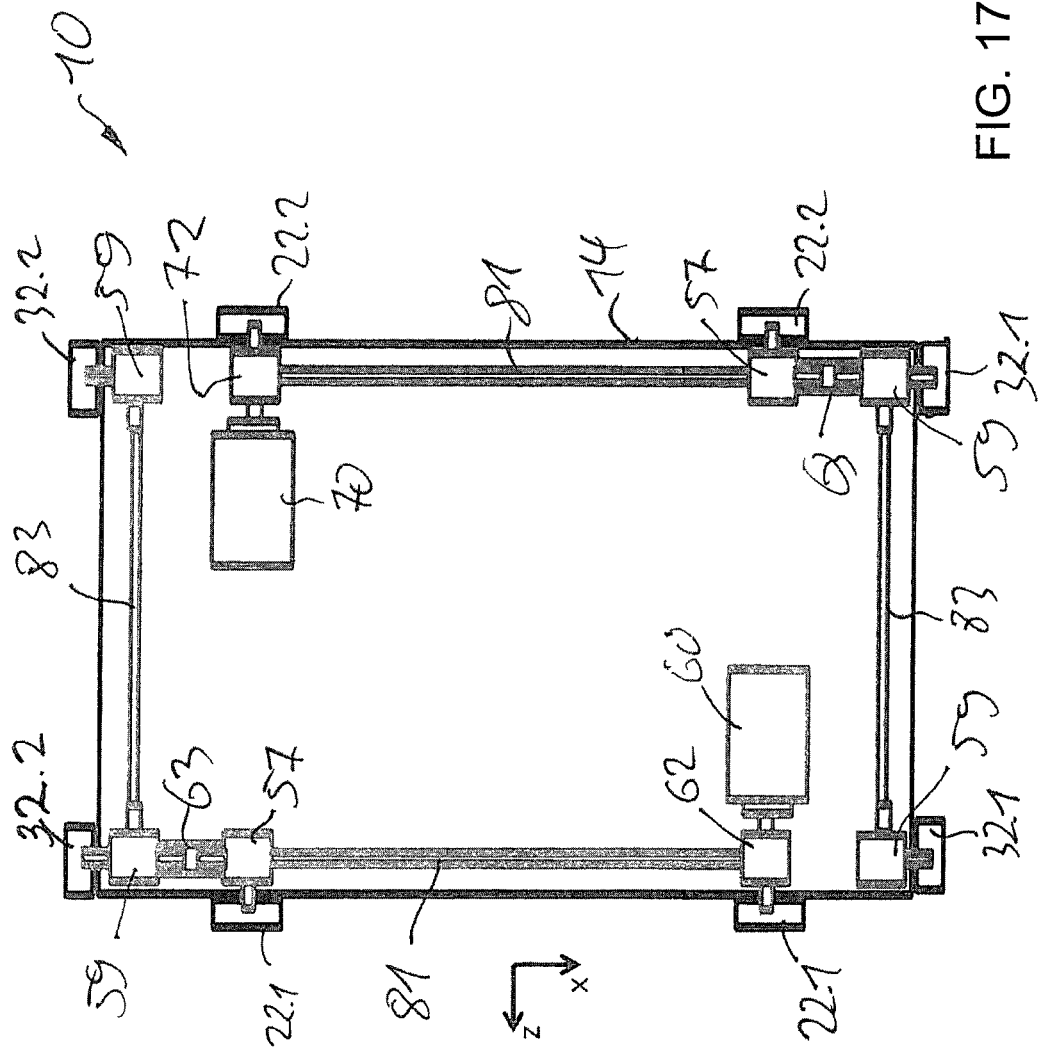

In the exemplary embodiment according to FIG. 17, the first travel drive assembly 60 is directly connected via the gearing to the left lower x wheel unit 22.1, and therefore said travel drive assembly is coupled in terms of height to the lifting movement of the left x wheel units 22. A further gearing 57 which is coupled to the gearing 62 via a shaft unit 81 is directed connected to the upper left x wheel unit 22.1. The upper right and left z wheel units 32 likewise have an upstream gearing 59, said gearings being coupled to each other in terms of drive via a second shaft unit 83. The connection between the gearing 57 and the further gearing 59 takes place via an cardan shaft 63. The coupling in terms of drive of the second travel drive assembly 70 to the right x wheel units 22.2 and left z wheel units 32.1 is configured in a corresponding manner.

The exemplary embodiment according to FIGS. 18A-B show a shaft drive with a sliding joint 47 as drive coupling apparatus. The two right z wheel units 32.2 are coupled to each other via the second shaft unit 83. The first travel drive assembly 60, which is connected via the second shaft unit 83 to a gearing 62, is directly connected to the right z wheel unit 32.2. The left x wheel units 22.1, which are coupled to each other via the first shaft unit 81 and associated gearing units 62, are coupled to each other in the upper left corner region via a sliding joint 47.1 to compensate for height, wherein the sliding joint 47.1 is illustrated schematically in FIG. 18B.

The embodiment according to FIGS. 19A-B differs from the embodiment in that the shaft units are replaced by toothed belts and the sliding joint 47.1 is replaced by a horizontal sliding joint 47.2 to compensate for height, said sliding joint being illustrated in highly schematized form in FIG. 19B.

FIG. 33 partially illustrates, in the top view, a detail of a rack system 25 with orthogonal travel routes 18 (x, z direction) and a pallet transport apparatus 10 which has a travel drive assembly control device 82 which has with the first travel drive assembly 60 for driving the right x wheel units 22.2 and left z wheel units 32.1 and a second travel drive assembly 70 for the left x wheel units 22.1 and right z wheel units 32.2. The travel route 18 is formed here by travel profiles running in the x and z direction. A sensor unit 84 is arranged in the left upper and right lower corner region of the chassis 14 of the pallet transport apparatus 10, the sensor units lying diametrically opposite each other, each sensor unit detecting a travel route marking 86 attached on the travel route 18 and outputting the signals thereof to the travel drive assembly control device 82. Depending on the signals received from the sensor units 84, that is to say the difference from desired travel route to ACTUAL travel route, the travel drive assembly control device 82 controls the drive of the first or second travel drive assembly 60, 70 in order to ensure exact straight-ahead travel at all times. Depending on a deviation after a rectilinear course of the travel route marking 86, the travel drive assembly control device 82 brings about a different drive of the right and left x wheel units 22.1, 22.2 or of the right and left z wheel units 32.1, 32.2 ("tank drive"), and therefore precise straight-ahead travel either in the x or z direction of the pallet transport apparatus 10 is permanently ensured.

The two sensor units 84 may also be arranged at the front or at the rear on one side of the vehicle. In this case, two sensor units arranged in parallel scan the travel route marking 86 and measure the respective deviations from the desired value. An angular measurement is formed from the deviation difference and forms the basis for the appropriate activation of the travel drive assembly 60 or 70 in order to correct the travel direction.

The travel drive assembly control device 82 is connected here for communication to a master rack system control device 73 which predetermines the movement of the pallet transport apparatus 10 to the respective target position in the x or z direction within the rack system 25.

As a supplement to the illustration in FIG. 33, in FIG. 35 there is a further sensor device 67, optionally with a plurality of sensor units (not illustrated) which determines the current position data of the pallet transport apparatus 10 with regard to the rack structure, for example position at a particular instance or a deviation from the straight-ahead course (x or z direction) and correspondingly acts upon the control device 82 with signals for activating the first or second travel drive assembly 60, 70 for the wheel units 22 or 32.

Figure 36A:
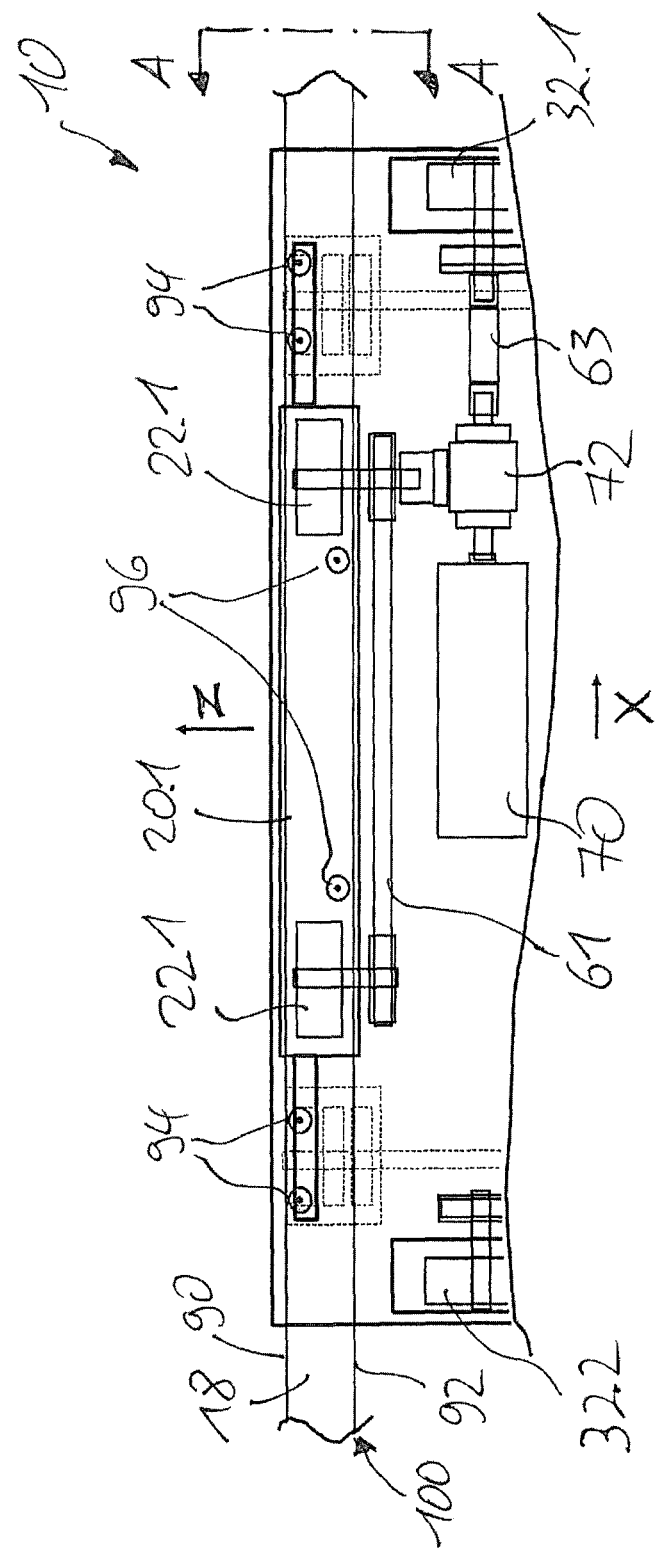
FIGS. 36A and 36B show a highly schematized bottom view of a detail of a pallet transport apparatus which has a mechanical guide roller device on a driving side (FIG. 36A), and a schematic section through the pallet transport apparatus according to FIG. 36A along the section guide A-A (FIG. 36B)
Figure 36B:
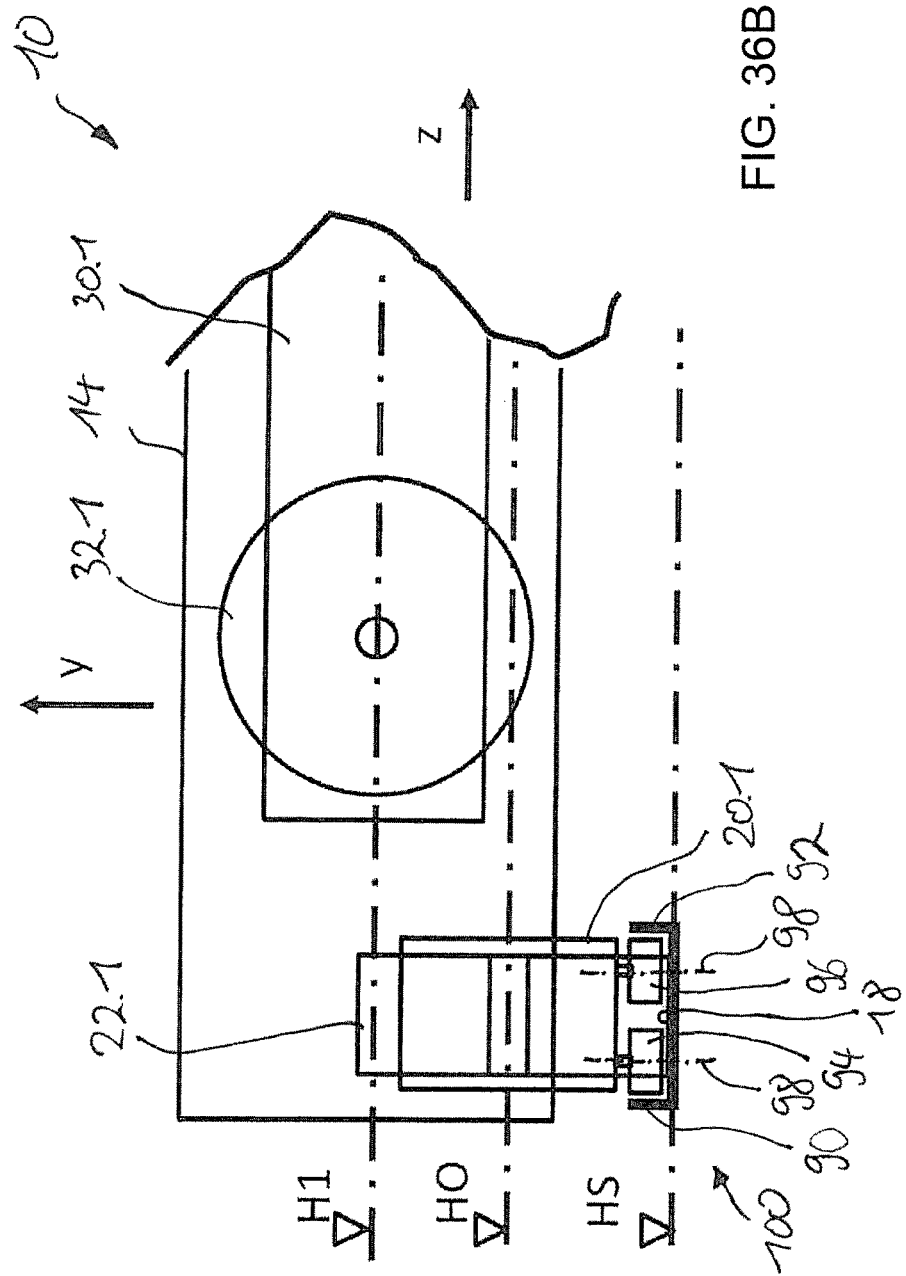

FIG. 36A illustrates the upper x side region in a bottom view of a pallet transport apparatus 10 according to FIG. 12, and FIG. 36b shows a section through said region along section guide A-A from FIG. 36A. Also illustrated is a mechanical guide roller device which ensures straight-ahead movement without the use of additional sensor units. The guide roller device is present here on an x side and/or on a z side.

The guide roller device has a second guide roller unit 96 which consists of two guide rollers spaced-apart in the x direction and are connected rotatably to the x traveling mechanism 20.1, that is to say also go along with the vertical movement of the x traveling mechanism 20.1 in the event of a change of direction. First guide roller units 94 which each consist of a pair of guide rollers are in each case arranged spaced apart on the left and right and spaced apart in the x direction from the second guide roller unit 96, wherein the guide rollers are spaced apart in the x direction. The two second guide roller units 96 are also coupled to the x traveling mechanism 20.1 and therefore also execute a lifting movement in the event of a change of travel direction. As is apparent from FIG. 36b, the first guide roller unit 94 and second guide roller unit 96 are in each case arranged offset in the z direction.

FIG. 36b illustrates a travel route profile 100 which forms the travel route 18 and, on the outer side, has an upwardly pointing first flange 90 and, on the inner side, an upwardly pointing second flange 92.

The first guide roller units 94 are arranged here in such a manner that the inner side of the first flange 90 forms a lateral stop for the guide roller units 94. The second guide roller unit 96 is arranged offset inwardly in the z direction in such a manner that the inner side of the second flange 92 forms a lateral stop for the guide roller unit 96, and therefore the entire guide roller device is guided precisely within the two flanges 90, 92 in the x direction. As a result of the fact that the first guide roller units 94 and the second guide roller unit are connected to the x traveling mechanism 20.1, they are disengaged from the travel route profile 100 as soon as the x traveling mechanism 20.1 is raised in the event of a change in travel route direction. A corresponding guide roller device may also be present on one side in the z direction.

All of the guide rollers of the guide roller units 94, 96 are mounted rotatably about a vertical axis of rotation 98 running in the y direction.

Figure 37A:
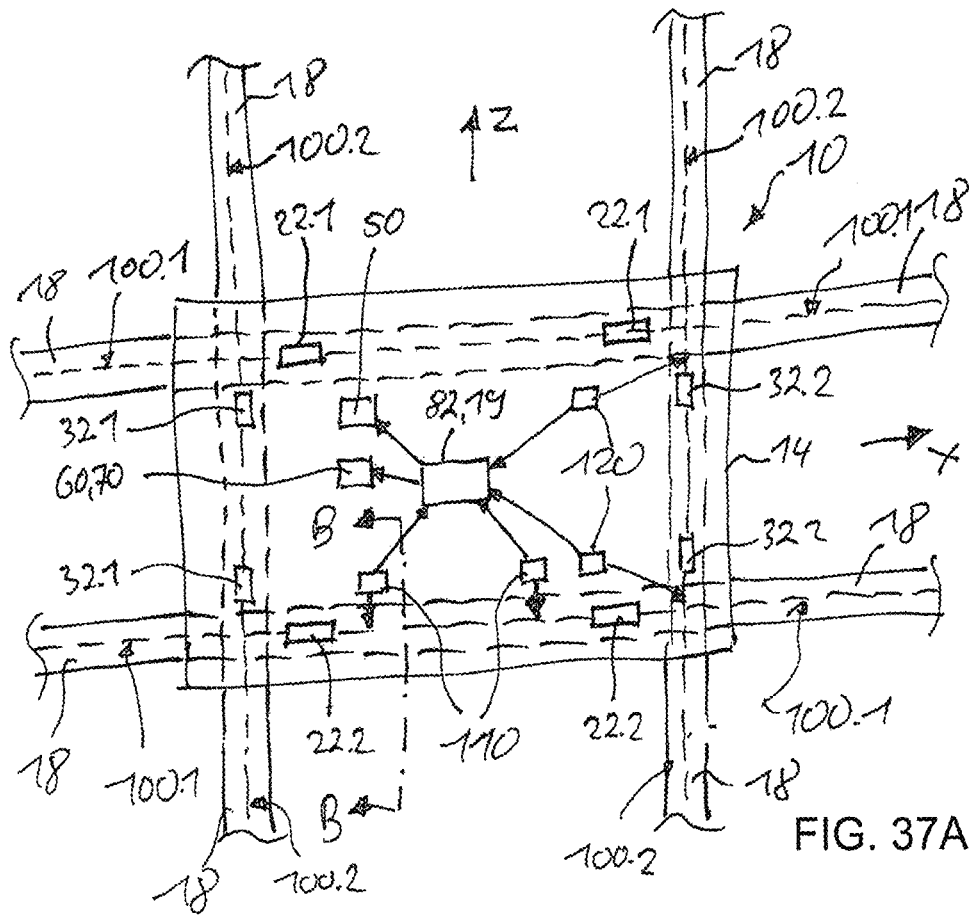
FIGS. 37A and 37B show a highly schematized illustration of a top view of a pallet transport apparatus which has two sensor units in the x direction on one driving side and two sensor units in the z direction on one driving side, said sensor units each detecting the inner contour of an x/z travel route profile in terms of distance and communicating with a control device for the travel drive assemblies (FIG. 37A), and a schematic cross section of a detail along section guide B-B according to FIG. 37A (FIG. 37B).
Figure 37B:
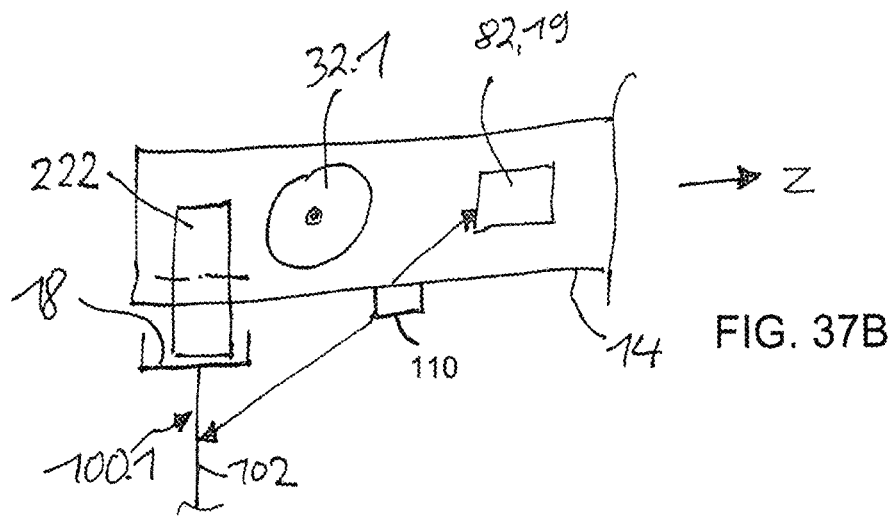

FIGS. 37A and b illustrate a further embodiment of a pallet transport apparatus according to the invention, which ensures an optimum, permanently reliable, functioning sensor control for the straight-ahead movement and the change of travel direction.

For this purpose, the pallet transport apparatus 10 has two x sensor units 110 which are present spaced apart in the x direction on an x side. Furthermore, z sensor units 120 which are spaced apart in the z direction are present on a z side. The two sensor units 110, 120 are connected to the pallet transport apparatus 10 below the vehicle thereof and communicate with a control device 82, 19 which activates the lifting assembly 50 and the first and second travel drive assemblies 60, 70.

The travel routes 18 in the x direction and in the z direction are formed by respective travel route profiles 100.1 and 100.2 which have a profile region 102 protruding downward in the y direction. The x sensor units 110 and the z sensor units 120 scan the inner side of the profile region 102 of the respective travel route profile 100.1 and 100.2 and output their determined values to the control device 82, 19.

During straight-ahead movement in the x or z direction, the control device 82, 19 calculates, from the signals of the respective x sensor units 110 and z sensor units 120, an angular position possibly deviating from the straight-ahead movement and, on the basis of this calculation, activates the first and second drive assembly 60, 70 to correct the angular deviation in order to ensure precise straight-ahead movement.

The x sensor units 110 and the z sensor units 120 are also used to determine the precise position of the pallet transport apparatus 10 in the event of a change of travel direction. If a change of travel direction from the x into the z direction is intended to be carried out, the signals of the z sensor units 120 are evaluated by the control device 82, 19 to the effect as to whether the actual distance to the lower profile region 102 of the z travel route profile 100.2 corresponds to the predetermined desired value for the precise positioning. As soon as a correspondence is determined, the control device 82, 19 brings about the activation of the lifting drive assembly 50, as a result of which, by lowering the z wheel units 32 and subsequently raising the x wheel units 22, a change of travel direction is performed. The sensor units 110, 120 are preferably designed as laser sensor units. However, use may be made of sensor units with other working principles which ensure a reliable distance measurement.

| | |
|---|---|
| 10 | Pallet transport apparatus .1 |
| 11 | |
| 12 | Pallet |
| 13 | |
| 14 | Chassis |
| 15 | |
| 16 | Pallet pickup unit |
| 17 | |
| 18 | Travel route |
| 19 | Lifting control device |
| 20 | Left and right x traveling mechanism .1, .2 |
| 21 | |
| 22 | Left and right x wheel units .1, .2 |
| 23 | Double scissors mechanism |
| 24 | Connecting profile |
| 25 | Rack system |
| 26 | Coupling member |
| 27 | Wedge unit |
| 28 | Double spindle unit |
| 29 | Scissors mechanism |
| 30 | Left and right z traveling mechanism .1, .2 |
| 31 | Prestressing shaft |
| 32 | Left and right z wheel units .1, .2 |
| 33 | Rotary lever |
| 34 | Connecting link disks x, y |
| 35 | Connecting link disks z |
| 36 | Connecting link |
| 37 | Frame profile |
| 38 | x connecting profile |
| 39 | z connecting profile |
| 40 | |
| 41 | Horizontal toggle lever mechanism |
| 42 | Coupling unit x |
| 43 | Coupling unit z |
| 44 | Coupling unit y |
| 45 | Spindle |
| 46 | Spindle nut |
| 47 | Sliding joint .1, .2 |
| 48 | (Wheel) spindle unit |
| 49 | Chain, belt |
| 50 | Lifting drive assembly (x, z) |
| 50.1 | Lifting drive assembly x |
| 50.2 | Lifting drive assembly z |
| 51 | |
| 52 | x lifting device |
| 54 | z lifting device |
| 56 | y lifting device |
| 57 | Gearing |
| 58 | Common rotary shaft |
| 59 | Gearing |
| 60 | $1^{st}$ travel drive assembly |
| 61 | Toothed belt |
| 62 | $1^{st}$ angular gearing |
| 63 | Cardan shaft |
| 64 | |
| 65 | |
| 66 | |
| 67 | Sensor device |
| 68 | Lever |
| 69 | Toggle lever mechanism |
| 70 | $2^{nd}$ travel drive assembly |
| 71 | Omega drive unit |
| 72 | $2^{nd}$ angular gearing |
| 73 | Rack system control device |
| 74 | Disk cam x |

| | |
|---|---|
| 75 | Disk cam z |
| 76 | Disk cam y |
| 77 | Rotary shaft |
| 78 | Rotary shaft |
| 79 | Coupling elements |
| 80 | Pre-zone |
| 81 | $1^{st}$ shaft unit |
| 82 | Control device (travel drive assemblies 60, 70) |
| 83 | $2^{nd}$ shaft unit |
| 84 | Sensor unit |
| 85 | Gearing for 50 |
| 86 | Travel route marking |
| 87 | Shaft unit for 50 |
| 88 | |
| 89 | |
| 90 | $1^{st}$ flange (on the outside) |
| 91 | |
| 92 | $2^{nd}$ flange (on the inside) |
| 93 | |
| 94 | $1^{st}$ guide roller unit ($1^{st}$ flange) |
| 95 | |
| 96 | $2^{nd}$ guide roller unit ($2^{nd}$ flange) |
| 97 | |
| 98 | Axis of rotation of 94, 96 (y direction) |
| 99 | |
| 100 | Travel route profile .1, .2 |
| 101 | |
| 102 | |
| 103 | |
| 104 | |
| 105 | |
| 106 | |
| 107 | |
| 108 | |
| 109 | |
| 110 | x sensor units |
| 111 | |
| 112 | |
| 113 | |
| 114 | |
| 115 | |
| 116 | |
| 117 | |
| 118 | |
| 119 | |
| 120 | z sensor units |
| 121 | |
| 122 | |
| 123 | |
| 124 | |
| 125 | |
| 126 | |
| 127 | |
| 128 | |
| 129 | |
| D | Direction of rotation |
| V | Displacement |
| P | Arrow (coupling device) |
| P' | Arrow (coupling device) |
| x | Longitudinal direction |
| z | Transverse direction |
| y | Vertical direction |
| h1 | Lifting distance of 22, 32 |
| h2 | Lifting distance of 16 |
| h12 | Height of wheel unit (lowered) and HS (travel route) |
| HS | Height level of travel route 18 |
| H0 | Height level of wheel unit (travel state) |
| H1 | Height level of wheel unit (retracted) |
| HP | Height level of wheel unit (pallet pickup) |

The invention claimed is:

1. A pallet transport apparatus for transporting pallets within a rack installation oriented orthogonally with a longitudinal (x) direction, a transverse (z) direction and a vertical (y) direction, along a travel route with longitudinal transport routes in the x direction and transverse transport routes in the z direction, said apparatus comprising:
a chassis with a pallet pickup unit;
an x traveling mechanism extending in the longitudinal direction with drivable left x wheel units and right x wheel units which are arranged laterally on the left and right and are spaced apart in the x direction;
a z traveling mechanism extending in the transverse direction with drivable, spaced-apart, left z wheel units and right z wheel units which are arranged laterally on the left and right;
travel drive assemblies for the x and z wheel units;
an x lifting device that lifts the x traveling mechanism and the x wheel units in the y direction;
a z lifting device that lifts the z traveling mechanism and the z wheel units in the y direction; and
a y lifting device that moves the pallet pickup unit, wherein
the x and z wheel units contact with the travel route depending on the x or z travel direction,
the x traveling mechanism/the x wheel units and the z traveling mechanism/the z wheel units are designed so as to be vertically moveable in the y direction mechanically independently of one another,
the x and z lifting devices are designed so as to be activatable in the y direction independently of one another and independently of the y lifting device,
each of the x, y and z lifting devices has at least one rotatable disk cam or at least one displaceable connecting link disk to which the respective traveling mechanism or the respective wheel units and/or the pallet pickup unit are coupled,
a geometry of the disk cams or connecting link disks determines the size and the temporal profile of the mechanically independent movement of the respective traveling mechanism/wheel units or pallet pickup unit in the y direction,
all of the disk cams/connecting link disks for the traveling mechanisms/wheel units and the pallet pickup unit are arranged on a common rotatable shaft or on a sliding mechanism, and
the movement sequences for the change of direction/lifting of the pallet pickup unit with respect to the lifting routes, which are temporally coordinated with one another, in the y direction are stored in the geometry and positional arrangement of the disk cams/connecting link disks.

2. The pallet transport apparatus according to claim 1, wherein the x, y, and z lifting devices are designed in such a manner that a change of direction of the travel direction from the x direction into the z direction and vice versa takes place by corresponding lowering and raising of the respective x/z traveling mechanisms or of the respective x/z wheel units without a simultaneous displacement of the pallet pickup unit taking place in the vertical direction via the y lifting device.

3. The pallet transport apparatus according to claim 1, wherein the x, y and z lifting devices, the x and z traveling mechanisms and the x and z wheel units are designed in such a manner that in the case of a change of direction from the x direction to the z direction with the apparatus stationary, the z lifting device lowers the z traveling mechanism or the z wheel units to the level of the x traveling mechanism or of the x wheel units and, subsequently, the x lifting device raises the x traveling mechanism or the x wheel units without, in the process, the height level of the pallet pickup unit changing, and, in the case of a change in direction from the z direction into the x direction, the procedure is correspondingly reversed.

4. The pallet transport apparatus according to claim 1, further comprising:
  a control device that controls the drive of the first and second travel drive assemblies and/or the lifting drive assemblies; and
  sensor units which detect the respective position of the pallet transport apparatus within the rack system and communicate correspondingly with the control device.

5. The pallet transport apparatus according to claim 4, further comprising:
  at least one first sensor unit which detects travel route markings/position markings present on the travel route and outputs corresponding signals to the control device for the tracking control and/or for the change of direction and/or for the lifting of the pallet pickup unit.

6. The pallet transport apparatus according to claim 5, wherein there are two first sensor units which are arranged lying diagonally opposite in the corner region of the apparatus.

7. The pallet transport apparatus according to claim 4, wherein there are additional sensor units which communicate with the control device and which serve for collision identification in the x and z direction and/or for identifying the occupancy of the storage space and/or for identifying the height level of the pallet pickup unit and/or for detecting the occupancy state of the pallet pickup unit.

8. A rack system, wherein the rack system contains at least one pallet transport apparatus according to claim 1.

* * * * *